(12) United States Patent
Kim et al.

(10) Patent No.: US 11,835,227 B2
(45) Date of Patent: Dec. 5, 2023

(54) RAW MATERIAL COMPOSITION FOR PREPARING OXYGEN CARRIER PARTICLES, OXYGEN CARRIER PARTICLES PREPARED BY USING SAME, AND METHOD FOR PREPARING OXYGEN CARRIER PARTICLES

(71) Applicant: KOREA ELECTRIC POWER CORPORATION, Naju-si (KR)

(72) Inventors: Ui Sik Kim, Seoul (KR); Jeom In Baek, Daejeon (KR); Joong Beom Lee, Daejeon (KR); Tae Hyoung Eom, Sejong (KR); Hyun Geun Jo, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 289 days.

(21) Appl. No.: 16/321,821

(22) PCT Filed: Sep. 22, 2017

(86) PCT No.: PCT/KR2017/010509
§ 371 (c)(1),
(2) Date: Jan. 29, 2019

(87) PCT Pub. No.: WO2018/056766
PCT Pub. Date: Mar. 29, 2018

(65) Prior Publication Data
US 2019/0170346 A1    Jun. 6, 2019

(30) Foreign Application Priority Data

Sep. 23, 2016 (KR) .................. 10-2016-0122466
May 19, 2017 (KR) .................. 10-2017-0062339

(51) Int. Cl.
*F23C 10/10* (2006.01)
*F23L 7/00* (2006.01)
(Continued)

(52) U.S. Cl.
CPC .............. *F23C 10/10* (2013.01); *B01J 8/1872* (2013.01); *B01J 8/228* (2013.01); *C01B 13/02* (2013.01);
(Continued)

(58) Field of Classification Search
CPC .......... F23C 10/10; B01J 8/1872; B01J 8/228; C01B 13/02; C01B 13/08; C01B 13/20;
(Continued)

(56) References Cited

U.S. PATENT DOCUMENTS 3,846,340 A * 11/1974 Okuyama ................ B01J 35/02
502/84
4,443,642 A * 4/1984 Keppel .................... B01J 21/04
585/428
(Continued)

FOREIGN PATENT DOCUMENTS

JP    2009227773 A    10/2009
JP    2010-251141 A    4/2010
(Continued)

OTHER PUBLICATIONS

Paglia et al ("Boehmite Derived y-Alumina System. 1. Structural Evolution with Temperature, with the Identification and Structural Determination of New Transition Phase, y-Alumina", Chem. Mater. (2004) 16, 220-236). (Year: 2004).*
(Continued)

*Primary Examiner* — Colin W. Slifka
*Assistant Examiner* — Michael Forrest
(74) *Attorney, Agent, or Firm* — Foundation Law Group, LLP

(57) ABSTRACT

A raw material composition for producing oxygen carriers includes a first component which is one or more of nickel
(Continued)

oxide and nickel hydroxide and a second component which is one or more of boehmite, cerium oxide, cerium hydroxide, magnesium oxide, magnesium hydroxide, and titanium oxide, wherein, when the first component is nickel oxide, the second component includes cerium hydroxide. Such a raw material composition for producing oxygen carriers of the present invention is formed into oxygen carriers according to an oxygen carrier producing method, which will be described below, by adjusting the composition, formulation of raw materials, and degree of homogenization. Then, it is possible to produce oxygen carriers having physical properties such as a shape, a particle size, and a particle distribution suitable for a fluidized bed process or a high speed fluidized bed process and having improved wear-resistance, long-term durability, and oxygen transfer performance.

23 Claims, 2 Drawing Sheets

(51) Int. Cl.

| | | |
|---|---|---|
| *C01B 13/20* | (2006.01) | |
| *C01B 13/08* | (2006.01) | |
| *B01J 8/18* | (2006.01) | |
| *C08L 29/04* | (2006.01) | |
| *C08L 71/08* | (2006.01) | |
| *B01J 8/22* | (2006.01) | |
| *C04B 35/626* | (2006.01) | |
| *C01B 13/02* | (2006.01) | |
| *C04B 35/01* | (2006.01) | |
| *C04B 35/632* | (2006.01) | |
| *C04B 35/634* | (2006.01) | |
| *C08L 1/28* | (2006.01) | |

(52) U.S. Cl.
CPC .............. *C01B 13/08* (2013.01); *C01B 13/20* (2013.01); *C04B 35/01* (2013.01); *C04B 35/626* (2013.01); *C04B 35/6263* (2013.01); *C04B 35/62655* (2013.01); *C04B 35/62675* (2013.01); *C04B 35/632* (2013.01); *C04B 35/634* (2013.01); *C08L 29/04* (2013.01); *C08L 71/08* (2013.01); *F23L 7/007* (2013.01); *C04B 2235/322* (2013.01); *C04B 2235/3206* (2013.01); *C04B 2235/3218* (2013.01); *C04B 2235/3222* (2013.01); *C04B 2235/3227* (2013.01); *C04B 2235/3232* (2013.01); *C04B 2235/3279* (2013.01); *C04B 2235/44* (2013.01); *C04B 2235/528* (2013.01); *C04B 2235/5427* (2013.01); *C04B 2235/5436* (2013.01); *C04B 2235/5463* (2013.01); *C08L 1/28* (2013.01); *F23C 2900/99008* (2013.01); *F23J 2215/50* (2013.01)

(58) Field of Classification Search
CPC ... C04B 35/01; C04B 35/626; C04B 35/6263; C04B 35/62655; C04B 35/62675; C04B 35/632; C04B 35/634; C08L 29/04; C08L 71/08; F23L 7/007
See application file for complete search history.

(56) References Cited

U.S. PATENT DOCUMENTS

| | | | | |
|---|---|---|---|---|
| 4,797,381 | A | * | 1/1989 | Bartek ................... B01J 23/002 502/202 |
| 2014/0295361 | A1 | * | 10/2014 | Fan .......................... F23C 10/04 431/170 |
| 2015/0075409 | A1 | * | 3/2015 | Darguy ............... C04B 40/0039 106/810 |

FOREIGN PATENT DOCUMENTS

| | | | | |
|---|---|---|---|---|
| KR | 10-2005-0045399 A | | 5/2005 | |
| KR | 20110047298 A | * | 5/2011 | .............. C10J 3/482 |
| KR | 10-2012-0013151 A | | 2/2012 | |
| KR | 20120013151 A | * | 2/2012 | ....... C04B 35/62675 |
| KR | 101546644 B1 | * | 8/2015 | |

OTHER PUBLICATIONS

Machine Translation for KR101546644 (Year: 2015).*
Baek et al (Effect of Support on the Performance of NiO-Based Oxygen Carriers, Oil & Gas Sci and Tech.—Rev. IFP Energies Nouvelles, vol. 66 (2011), No. 2, pp. 223-234.) (Year: 2011).*
Haibo Zhao et al., Sol-Gel-Derived NiO/NiAl2O4 Oxygen Carriers for Chemical-Looping Combustion by Coal Char, energy & fuels, Feb. 20, 2008, pp. 898-905, vol. 22, No. 2.
Fang Liu , Cerium Oxide (CeO2) Promoted Oxygen Carrier Development and Scale Modeling Study for Chemical Looping Combustion, Theses and Dissertations—Mechanical Engineering, 2013, pp. 1-78.
J.-I. Baek et al.,Effects of Support on the Performance of NiO-Based Oxygen Carriers, Oil & Gas Science and Technology—Rev. IFP Energies nouvelles, 2011, pp. 223-234, vol. 66, No. 2.
Saurabh Bhavsar, Reducible Supports for Ni-based Oxygen Carriers in Chemical Looping Combustion, energy& fuels, Mar. 29, 2013, pp. 2073-2084, vol. 27, No. 4.
Shao, H. et al., Sol Gel-Derived NiO/NiAl2O4 Oxygen Carriers for Chemical-Looping Combustion by Coal Char, Energy & Fuels, Feb. 20, 2008, pp. 898-905, vol. 22, No. 2.
Bhavsar, S. et al., Reducible Supports for Ni-based Oxygen Carriers in Chemical Looping Combustion, Energy & Fuels, Mar. 29, 2013, pp. 2073-2084, vol. 27, No. 4.
An Office Action dated Jan. 14, 2020 in the corresponding Canadian Patent Application No. 3032070.
Communication from Canadian Patent Office for Office Action dated Nov. 15, 2020 of the Canadian Patent application No. 3032070, which corresponds to the present application.

* cited by examiner

[FIG.1]
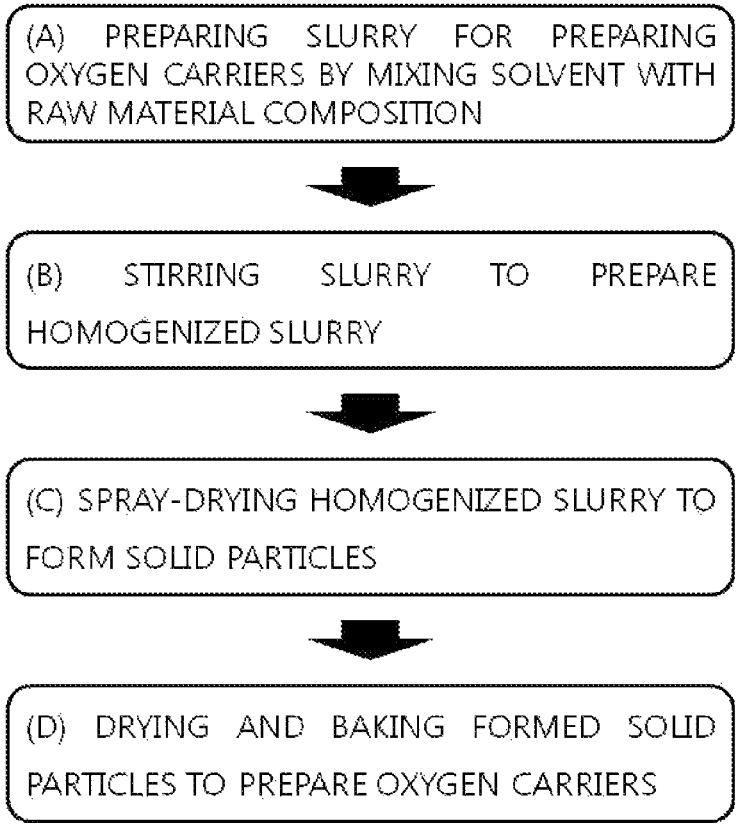
[FIG.2]
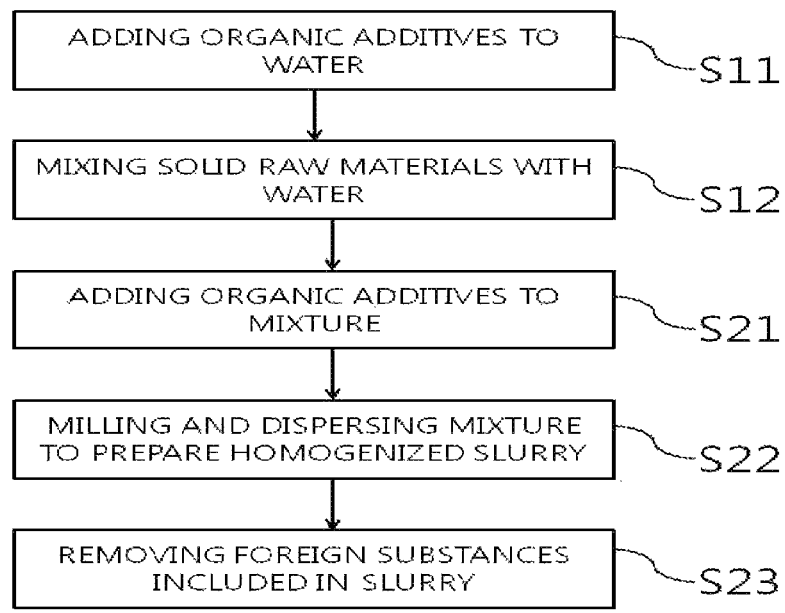

[FIG.3]
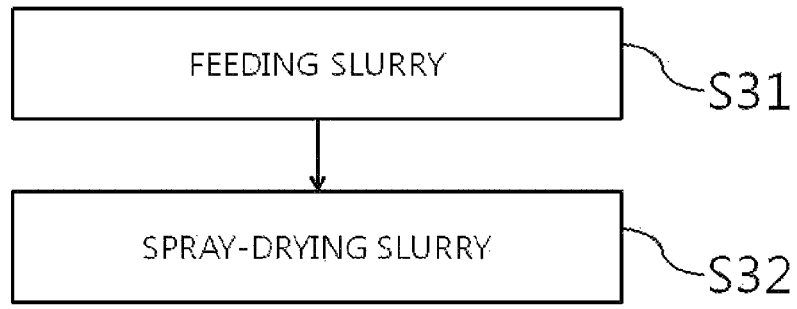
[FIG.4]
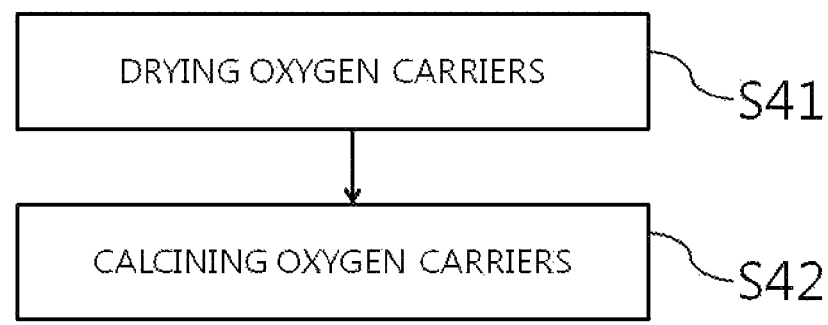
[FIG.5]
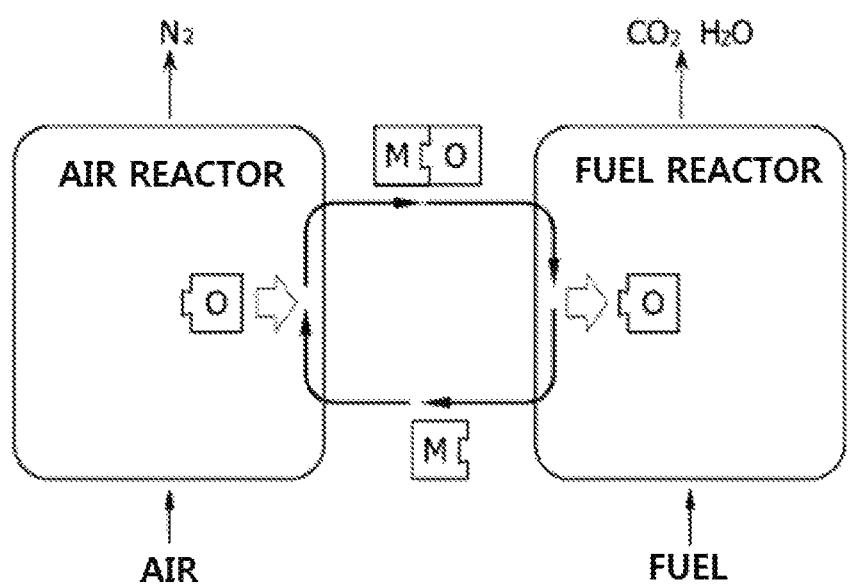

RAW MATERIAL COMPOSITION FOR PREPARING OXYGEN CARRIER PARTICLES, OXYGEN CARRIER PARTICLES PREPARED BY USING SAME, AND METHOD FOR PREPARING OXYGEN CARRIER PARTICLES

CROSS REFERENCE TO RELATED PATENT APPLICATIONS

This application claims the benefit under 35 U.S.C. Section 371, of PCT International Application No. PCT/KR2017/010509, filed on Sep. 22, 2017, which claimed priority to Korean Patent Application No. 10-2016-0122466 filed on Sep. 23, 2016, and Korean Patent Application No. 10-2017-0062339 filed on May 19, 2017, the disclosures of which are hereby incorporated by the references.

TECHNICAL FIELD

The present invention relates to a raw material composition for preparing oxygen carriers, oxygen carriers prepared using the same, and a method of preparing oxygen carriers.

BACKGROUND ART

Due to the greenhouse effect caused by an increase in carbon dioxide ($CO_2$) concentration in the atmosphere, an average temperature of the Earth has increased and damage by climate change is continuously occurring. Thermal power plants are point sources of $CO_2$ emission that emit the largest amounts of anthropogenic $CO_2$. Reduction of $CO_2$ emission from thermal power plants may be achieved by carbon capture and storage (CCS). However, when a conventional CCS technology is applied to power plants, power generation efficiency is significantly decreased which leads to an increase in costs for power generation. Accordingly, there is a need for a new technology to minimize a decrease in power generation efficiency and to lower $CO_2$ capture costs.

Chemical looping combustion (CLC) technology has gained attention as a technology that captures $CO_2$ while reducing a penalty in power generation efficiency. In the CLC technology, fuel combustion occurs by oxygen supplied from solid particles (oxygen carriers) which have metal oxides as their main components, and thus flue gas contains water vapor and $CO_2$ only. After condensing water vapor, only $CO_2$ remains. Therefore, it is possible to separate $CO_2$ without separate additional capture plant. A CLC process is consisted of two inter-connected fluidized-bed reactors, a fuel reactor and an air reactor. In a fuel reactor, a reduction reaction of oxygen carriers occurs as oxygen contained in the oxygen carriers is transferred to fuel. In an air reactor, the reduced oxygen carriers are oxidized by receiving oxygen in the air and thus the oxygen carriers are regenerated to an initial oxidized state. The overall process becomes a circulating fluidized-bed process.

Oxygen carriers applied to such a CLC process should satisfy various conditions required for fluidized bed process. The oxygen carriers should have physical properties suitable for a fluidized bed process. That is, the oxygen carriers should have sufficient strength and spherical shape, a packing density or tapped density, an average particle size, and a particle size distribution suitable for fluidization. In addition, in terms of reactivity, the oxygen carriers should have high oxygen transfer capacity so that the oxygen carriers are able to supply sufficient oxygen required for complete fuel combustion while the fuel passes through a fuel reactor.

However, conventional oxygen carriers have a problem in that the oxygen carriers are prepared using a method not suitable for mass preparation, physical properties such as the shape, strength, and density of the oxygen carriers are either not suitable for application to a fluidized bed process or require improvements, a support material having a stable crystal structure is used to decrease an intensity of an interaction between metal oxides and the support material, which increases a calcination temperature for obtaining sufficient strength and degrades oxygen transfer performance, fluidization does not occur due to an agglomeration phenomenon between the oxygen carriers during a reaction, or content of metal oxides is low and thus the oxygen transfer capacity is low.

Therefore, there is a need for development of oxygen carriers which have sufficient strength and physical properties suitable for a fluidized bed process, suppress an agglomeration phenomenon between the oxygen carriers that may occur during a reaction in an oxidation-reduction cycle, do not cause significant degradation of oxygen transfer performance even during calcination at a high temperature, and are capable of lowering a calcination temperature.

DISCLOSURE

Technical Problem

One object of the present invention is to provide a raw material composition for preparing oxygen carriers having physical properties, including strength, suitable for a fluidized bed process and having improved attrition resistance, long-term durability, and oxygen transfer performance while reducing a calcination temperature as compared with the prior art.

Another object of the present invention is to provide oxygen carriers and a method of preparing the same in which the above-described raw material composition is used to prepare a uniformly dispersed, stable fluidic colloidal slurry, and the fluidic colloidal slurry is used to prepare oxygen carriers having excellent attrition resistance and oxygen transfer performance at a lower calcination temperature as compared with the prior art while having a shape, a particle size, a particle size distribution, and mechanical strength or attrition resistance suitable for a chemical looping combustion (CLC) circulating fluidized bed process.

Still another object of the present invention is to provide a chemical looping combustion (CLC) method in which, while a fuel is effectively combusted using the above-described oxygen carriers, carbon dioxide ($CO_2$) generated by the combustion is internally captured within the boiler, and, while oxygen carrier inventory in a CLC process and a makeup quantity to compensate for attrition loss which occurs during a long-term operation are reduced, a decrease in thermal efficiency of a system due to $CO_2$ capture is lessened.

Technical Solution

An embodiment of the present invention relates to a raw material composition for preparing oxygen carriers, the raw material composition including a first component which is one or more of nickel oxide and nickel hydroxide and a second component which is one or more of boehmite, cerium oxide, cerium hydroxide, magnesium oxide, magnesium hydroxide, and titanium oxide, wherein, when the first component is nickel oxide, the second component includes cerium hydroxide.

The raw material composition for preparing oxygen carriers may include 55 weight % to 80 weight % nickel hydroxide, 15 weight % to 40 weight % boehmite, and 3 weight % to 15 weight 5 magnesium oxide or magnesium hydroxide.

The raw material composition for preparing oxygen carriers may include 55 weight % to 75 weight % nickel oxide and 25 weight % to 45 weight % cerium hydroxide.

The raw material composition for preparing oxygen carriers may include 55 weight % to 80 weight % nickel hydroxide, 5 weight % to 35 weight % boehmite, 3 weight % to 20 weight % cerium oxide or cerium hydroxide, 3 weight % to 15 weight % magnesium oxide or magnesium hydroxide, and 0 weight % to 15 weight % titanium oxide.

The nickel oxide or nickel hydroxide may have an average particle size in the range of greater than 0 to 5 μm and a purity of 98% or higher.

The boehmite may be in the form of a powder or sol and may have an average particle size in the range of greater than 0 to 5 μm in which the boehmite is dispersed in a solvent and a purity of 98% or higher in a state.

The cerium oxide or cerium hydroxide may have an average particle size in the range of greater than 0 to 5 μm and a purity of 98% or higher.

The magnesium oxide or magnesium hydroxide may have an average particle size in the range of greater than 0 to 5 μm and a purity of 97% or higher.

The titanium oxide may have an average particle size in the range of greater than 0 to 5 μm and a purity of 95% or higher.

Another embodiment of the present invention relates to oxygen carriers which are formed from the above-described raw material composition for preparing oxygen carriers and which include nickel oxide.

The oxygen carriers may be subjected to a attrition test for 5 hours at a flow rate of 10.00 l/min (273.15 K, 1 bar) according to ASTM D5757-95 from the American Society for Testing Materials (ASTM) using a attrition tester, and then a attrition index indicated using Equation 1 below may be 20% or lower.

$$AI\ (\%) = [(W2)/(W1)]$$ [Equation 1]

In Equation 1, W1 represents a weighting of a sample before the attrition test, and W2 represents a weight in g of fine particles captured during the 5 hours of the attrition test.

The oxygen carriers may have a shape of spherical non-blowholes, an average particle size in the range of 60 μm to 150 μm, a particle size distribution in the range of 30 μm to 400 μm, and a packing density in the range of 1.0 g/ml to 4.0 g/ml.

An oxygen transfer capacity of the oxygen carriers may be in the range of 8 weight % to 25 weight % based on the total weight of the oxygen carriers.

Still another embodiment of the present invention relates to a method of preparing oxygen carriers, the method including: (A) preparing a slurry for preparing oxygen carriers by mixing a solvent with the raw material composition for preparing oxygen carriers of any one of claims 1 to 9; (B) stirring the slurry to prepare a homogenized slurry; (C) spray-drying the homogenized slurry to form solid particles; and (D) drying and calcining the formed solid particles to prepare oxygen carriers.

In the (A) preparing the slurry for preparing oxygen carriers, the raw material composition for preparing oxygen carriers and the solvent may be mixed at a weight ratio of 15 to 60:40 to 85, and the solvent may be water.

In the (A) preparing the slurry for preparing oxygen carriers, the slurry may further include one or more additives of a dispersant, a defoamer, and an organic binder.

The dispersant may include one or more of an anionic surfactant, a cationic surfactant, an amphoteric surfactant, and a nonionic surfactant.

The anionic surfactant may include one or more of a poly-carboxylate salt and a poly-carboxylate amine salt.

The defoamer may include one or more of a silicone-based defoamer, a metal soap-based defoamer, an amide-based defoamer, a polyether-based defoamer, a polyester-based defoamer, a polyglycol-based defoamer, and an alcohol-based defoamer.

The organic binder may include one or more of a polyvinyl alcohol, polyethylene glycol, and methylcellulose.

The additives may include all of the dispersant, the defoamer, and the organic binder, and the dispersant is present in an amount of 0.01 to 5.0 parts by weight, the defoamer is present in an amount of 0.01 to 1.0 parts by weight, and the organic binder is present in an amount of 1.0 to 5.0 parts by weight based on 100 parts by weight of the raw material composition for preparing oxygen carriers.

The (B) stirring of the slurry to prepare the homogenized slurry may further include removing foreign substances from the stirred and milled slurry.

The (C) spray-drying of the homogenized slurry to form the solid particles comprises pumping the homogenized slurry into a spray-dryer and spraying while maintaining an inlet air temperature in the range of 260° C. to 300° C. and an outlet air temperature in the range of 90° C. to 150° C. to form the solid particles.

The (D) drying and calcining the formed solid particles to prepare oxygen carriers may include drying the formed solid particles at 110° C. to 150° C. for 2 to 24 hours, putting the dried solid particles in a calcination furnace, and elevating a temperature therein to a temperature in the range of 1000° C. to 1450° C. at a rate in the range of 1° C./min to 5° C./min to calcine the dried solid particles for 2 to 10 hours.

Yet another embodiment of the present invention relates to a chemical looping combustion (CLC) method including contacting the above-described oxygen carriers with a fuel so that the oxygen carriers are reduced and the fuel is combusted, and contacting the reduced oxygen carriers with oxygen so that the oxygen carriers are regenerated.

Advantageous Effects

The present invention can provide a raw material composition for preparing oxygen carriers having physical properties, including strength, suitable for a fluidized bed process and having improved attrition resistance, long-term durability, and oxygen transfer performance while a calcination temperature is lowered as compared with the prior art. Also, the present invention can provide oxygen carriers and a method of preparing the same in which the above-described raw material composition is used to prepare oxygen carriers having excellent attrition resistance, long-term durability, and oxygen transfer performance while having a shape, a particle size, a particle size distribution, and a mechanical strength or attrition resistance suitable for a chemical looping combustion (CLC) circulating fluidized bed process. In addition, the present invention can provide a CLC method in which, while oxygen carrier inventory in a CLC process and a makeup quantity to compensate for attrition loss which occurs during a long-term operation are reduced using the above-described oxygen carriers, a decrease in thermal efficiency of a system due to $CO_2$ capture is lessened.

DESCRIPTION OF DRAWINGS

FIG. 1 is a flowchart illustrating a method of preparing oxygen carriers according to an embodiment of the present invention.

FIG. 2 is a flowchart illustrating steps (A) and (B) of the method of preparing oxygen carriers of the present invention.

FIG. 3 is a flowchart illustrating step (C) of the method of preparing oxygen carriers of the present invention.

FIG. 4 is a flowchart illustrating step (D) of the method of preparing oxygen carriers of the present invention.

FIG. 5 is a schematic diagram of a chemical looping combustion (CLC) method according to an embodiment of the present invention.

BEST MODE OF THE INVENTION

<Raw Material Composition for Preparing Oxygen Carriers>

An embodiment of the present invention relates to a raw material composition for preparing oxygen carriers, the raw material composition including a first component which is one or more of nickel oxide and nickel hydroxide and a second component which is one or more of boehmite, cerium oxide, cerium hydroxide, magnesium oxide, magnesium hydroxide, and titanium oxide, wherein, when the first component is nickel oxide, the second component includes cerium hydroxide.

Such a raw material composition for preparing oxygen carriers of the present invention is formed into oxygen carriers according to an oxygen carrier preparing method, which will be described below, by adjusting the composition, formulation of raw materials, and degree of homogenization. Then, it is possible to prepare oxygen carriers having physical properties such as a shape, a particle size, and a particle distribution suitable for a fluidized bed process and having improved attrition-resistance, long-term durability, and oxygen transfer performance while a calcination temperature is lowered as compared with the prior art.

In addition, the oxygen carriers prepared by the suggested raw material composition for preparing oxygen carriers have an excellent characteristic of transferring oxygen for both solid fuels and gas fuels such as liquefied natural gas, shale gas, and synthetic gas and being rapidly regenerated by obtaining oxygen from a gas containing oxygen such as air, and the oxygen carriers may be repeatedly used continuously. Accordingly, when the oxygen carriers are applied to a chemical looping combustion process (CLC process), it is possible to reduce the an oxygen carrier inventory and a makeup quantity for attrition loss during a long-term operation. Thereby, the CLC process can be more compact and more economical.

The raw material composition for preparing oxygen carriers of the present invention includes one or more active raw materials of nickel oxide (NiO) and nickel hydroxide $(Ni(OH)_2)$ as a first component.

When nickel oxide is applied to CLC process or the like, the nickel oxide serves to transfer oxygen to a fuel so that the nickel oxide itself is reduced while the fuel is efficiently combusted and the reduced nickel serves to receive oxygen from the air again to be regenerated.

The nickel oxide may be industrial nickel oxide whose average particle size is in the range of greater than 0 to 5 µm, specifically, in the range of greater than 0 to 4 µm. In such a range, sufficient mechanical strength suitable for use in a fluidized bed process may be obtained even at a lower calcination temperature, and the degree of dispersion in the oxygen carrier may be made more uniform.

The nickel oxide may include various precursors thereof which may be converted to nickel oxide.

The nickel oxide may have a purity of 98% or higher, e.g., a purity of 99% or higher. In such a range, the strength and oxygen transfer capacity of the oxygen carriers may be further improved.

Nickel hydroxide becomes nickel oxide (NiO) as water is discharged from the nickel hydroxide in a calcination process when the oxygen carriers are prepared. When the nickel oxide formed from the nickel hydroxide is applied to the CLC process or the like, the nickel oxide serves to transfer oxygen to a fuel so that the nickel oxide itself is reduced to nickel (Ni) while the fuel is efficiently combusted and the reduced nickel serves to receive oxygen from the air to be regenerated.

In addition, when nickel hydroxide $(Ni(OH)_2)$ is used as an active raw material, sufficient strength suitable for use in a fluidized bed process may be obtained even at a lower calcination temperature as compared with when nickel oxide (NiO) is used, and magnesium (Mg) content may be increased while maintaining excellent oxygen transfer performance. Thus, there is an effect of addressing a problem of an agglomeration phenomenon between the oxygen carriers that may occur during a reaction in an oxidation-reduction cycle of CLC. Also, the nickel hydroxide $(Ni(OH)_2)$ is advantageous for allowing the shape of the oxygen carriers to be spherical.

The nickel hydroxide may be industrial nickel hydroxide whose average particle size is in the range of greater than 0 to 5 µm), specifically, in the range of greater than 0 to 4 µm. In such a range, sufficient strength suitable for use in a fluidized bed process may be obtained even at a lower calcination temperature, and the degree of dispersion may be made more uniform.

The nickel hydroxide may have a purity of 98% or higher, e.g., a purity of 99% or higher. In such a range, the strength and oxygen transfer capacity of the oxygen carriers may be further improved.

The raw material composition for preparing oxygen carriers of the present invention may use nickel oxide or nickel hydroxide alone or in combination with other metal oxides.

Types of metal oxides that may be used in combination with one or more of the nickel oxide (NiO) and nickel hydroxide $(Ni(OH)_2)$ are not particularly limited. Specifically, examples of the metal oxides include copper-based oxides including copper oxides (CuO, $Cu_2O$), iron-based oxides including iron oxides (FeO, $Fe_2O_3$, $Fe_3O_4$), manganese-based oxides including manganese oxides (MnO, $MnO_2$, $Mn_2O_3$, $Mn_3O_4$), and cobalt-based oxides including cobalt oxides (CaO, $Co_3O_4$).

The content of one or more of the nickel oxide and nickel hydroxide may be 55 weight % to 80 weight %, e.g., 55 weight % to 80 weight %, 55 weight % to 75 weight %, 60 weight % to 70 weight %, based on the total raw material composition for preparing oxygen carriers. Also, when the nickel oxide and nickel hydroxide are used in combination, the content refers to a sum of weights of the nickel oxide and nickel hydroxide. In the above content range, the oxygen carriers may have improved oxygen transfer capacity and excellent physical properties such as high attrition resistance of the oxygen carriers after calcination, and a sintering phenomenon between nickel oxide (NiO) grains in the oxygen carriers may be suppressed during calcination process.

The raw material composition for preparing oxygen carriers of the present invention includes one or more raw support materials of boehmite (AlOOH), cerium oxide, cerium hydroxide, magnesium oxide, magnesium hydroxide, and titanium oxide as a second component.

The boehmite (AlOOH) may support nickel oxide or nickel oxide formed from nickel hydroxide during a calcination process to be evenly distributed throughout the oxygen carriers so that utilization of active components is improved, may provide a porous structure required for diffusion of a reaction gas, and simultaneously serve as an inorganic binder to provide sufficient strength to the oxygen carriers after calcination. That is, boehmite may simultaneously perform a function of supporting nickel oxide or nickel oxide generated from nickel hydroxide and serve as an inorganic binder that binds to one another during calcination to give strength to the oxygen carriers.

In addition, the boehmite may serve to suppress agglomeration between oxygen carrier particles while the oxygen carriers repeat an oxidation-reduction cycle at a high temperature, may serve to suppress a sintering phenomenon of grains of an active material (NiO), and may serve to create a path between the outside of the oxygen carriers and the active material so that gases before and after a reaction may easily enter and exit (be diffused) therebetween.

The boehmite is structurally unstable as compared with gamma alumina or alpha alumina. Due to such a characteristic, as water ($H_2O$) is discharged from the boehmite according to a temperature increases during calcination, the boehmite is transformed to gamma alumina or alpha alumina, and in this process, the boehmite forms pores and binds to one another. Therefore, the boehmite has an advantage of being able to give higher strength and higher porosity to the oxygen carriers at a relatively lower calcination temperature.

The boehmite may be in the form of a powder or sol and may have an average particle size in the range of greater than 0 to 5 μm, e.g., in the range of greater than 0 to 1 μm in a state in which the boehmite is dispersed in a solvent and a purity of 98% or higher. In such ranges, sufficient strength suitable for use in a fluidized bed process may be obtained even at a lower calcination temperature, and the degree of dispersion of active materials in the oxygen carriers may be made more uniform.

Forms in which the boehmite is supplied are not limited. For example, the boehmite may be boehmite in the form of a sol that is mixed in a solvent or may be boehmite supplied in the form of a solid powder. In such cases, the finally prepared oxygen carriers may have characteristics more suitable for a fluidized bed process and have excellent strength at a lower calcination temperature.

The content of the boehmite may be 5 weight % to 40 weight %, e.g., 5 weight % to 35 weight % or 15 weight % to 40 weight %, based on the total raw material composition for preparing oxygen carriers. In the above content range, the sintering phenomenon between active materials in the oxygen carriers may be more efficiently prevented such that the oxygen transfer capacity of the oxygen carriers is improved.

The cerium oxide ($CeO_2$) or cerium hydroxide ($Ce(OH)_4$) becomes cerium oxide ($CeO_2$) as water is discharged from the cerium hydroxide during a calcination process when the oxygen carriers are prepared. In this process, the cerium oxide may support nickel oxide particles, which are active components, to be evenly distributed throughout the oxygen carriers so that utilization of the active components is improved and may accelerate oxygen transfer. Further, since the cerium oxide itself has a function of exchanging oxygen, the cerium oxide improves the oxygen transfer capacity. Also, the cerium hydroxide may allow the shape of the oxygen carriers to be spherical.

In addition, the cerium oxide ($CeO_2$) or cerium hydroxide ($Ce(OH)_4$) may also simultaneously serve as an inorganic binder to provide sufficient strength for a fluidized bed process, to the oxygen carriers after calcination.

That is, cerium oxide ($CeO_2$) or cerium hydroxide ($Ce(OH)_4$) may simultaneously perform a function of supporting metal oxides, i.e., active materials (nickel oxides), an inorganic binder and an oxygen transfer accelerator.

In addition, the cerium oxide ($CeO_2$) or cerium hydroxide ($Ce(OH)_4$) may serve to suppress a phenomenon in which the oxygen carriers agglomerate with each other while the oxygen carriers repeat an oxidation-reduction cycle at a high temperature, may serve to suppress a sintering phenomenon of grains of an active material (NiO), and may serve to create a path between the outside of the oxygen carriers and the active material so that gases before and after a reaction may easily enter and exit (be diffused) therebetween.

The content of the cerium oxide ($CeO_2$) or cerium hydroxide ($Ce(OH)_4$) may be 3 weight % to 45 weight %, e.g., 3 weight % to 20 weight %. 25 weight % to 45 weight %, based on the total raw material composition for preparing oxygen carriers. In such a content range, the effects of increasing porosity, improving physical properties, and preventing the sintering phenomenon of active materials in the oxygen carriers may be further enhanced. Also, in such a content range, the oxygen transfer capacity may be further increased, and by decreasing an intensity of an interaction between active components in the calcination process of the oxygen carriers, the oxygen transfer capacity may be further improved.

The cerium oxide or cerium hydroxide may have an average particle size in the range of greater than 0 to 5 μm in a state in which the cerium oxide or cerium hydroxide is dispersed in a solvent and a purity of 98% or higher. In such ranges, sufficient strength suitable for use in a fluidized bed process may be obtained at a lower calcination temperature, and the degree of dispersion of active materials in the oxygen carriers may be made more uniform.

Forms in which the cerium oxide or cerium hydroxide is supplied are not limited. For example, the cerium oxide or cerium hydroxide may be supplied in the form of a solid powder. In such a case, the finally prepared oxygen carriers may have characteristics more suitable for a fluidized bed process and have excellent strength at a lower calcination temperature.

In the raw material composition for preparing oxygen carriers of the present invention, the magnesium oxide (MgO) or magnesium hydroxide ($Mg(OH)_2$) may serve to give porosity and strength to oxygen carriers while binding to one another or binding to boehmite, which is a raw support material used in combination therewith, during a calcination process.

The magnesium hydroxide ($Mg(OH)_2$) may be transformed to magnesium oxide (MgO) as water is discharged therefrom according to a temperature increases during calcination, and the magnesium hydroxide ($Mg(OH)_2$) particles may bind to one another or bind to boehmite which is used in combination with the magnesium hydroxide ($Mg(OH)_2$) as a support material. Accordingly, as compared with the prior art in which oxygen carriers are prepared using a raw material composition including alpha-alumina or magnesium aluminate, oxygen carriers of the present invention may have sufficient strength for a fluidized bed process while lowering calcination temperature.

In the present invention, by a method of adding magnesium oxide (MgO) or magnesium hydroxide (Mg(OH)$_2$), a magnesium (Mg) component is added to oxygen carriers. In such a case, when the oxygen carriers are applied to the CLC process, it is possible to achieve an effect of addressing a problem of agglomeration between oxygen carriers that may occur during a cyclic oxidation-reduction reaction.

The magnesium oxide or magnesium hydroxide may have an average particle size in the range of greater than 0 to 5 μm and a purity of 97% or higher. In such ranges, sufficient strength suitable for use in a fluidized bed process may be obtained at an lower calcination temperature, and the degree of dispersion in the oxygen carrier may be made more uniform.

The content of magnesium oxide (MgO) or magnesium hydroxide (Mg(OH)$_2$) may be 3 weight % to 15 weight % based on the total weight of the raw material composition for preparing oxygen carriers. When the content of the magnesium oxide (MgO) or magnesium hydroxide (Mg(OH)$_2$) is less than 3 weight %, there are concerns that physical properties may be degraded, e.g., the porosity may be decreased, the agglomeration phenomenon may occur between oxygen carriers during a reaction in a CLC cycle, and the sintering phenomenon may occur between active materials. Conversely, when the content of magnesium oxide (MgO) or magnesium hydroxide (Mg(OH)$_2$) exceeds 15 weight %, there is a concern that oxygen transfer performance may be degraded, e.g., the oxygen transfer capacity may be decreased due to the sintering phenomenon between active materials which occurs due to an increase in a calcination temperature for obtaining strength, an oxygen transfer rate may be decreased, or the oxygen carriers may not be regenerated to their initial state in an oxidation reaction in which the oxygen carriers are supposed to obtain oxygen from the air to be regenerated.

The titanium oxide may serve to give porosity and strength to oxygen carriers by the particles binding to one another or binding to other raw materials like as boehmite, magnesium oxide (MgO), or magnesium hydroxide (Mg(OH)$_2$) which used in combination therewith, during a calcination process.

The content of the titanium oxide may be 0 weight % to 15 weight % based on the total weight of the raw material composition for preparing oxygen carriers. When the content of the titanium oxide exceeds 15 weight %, there is a concern that oxygen transfer performance may be degraded, e.g., the oxygen transfer capacity may be decreased due to the sintering phenomenon between active materials which occurs due to an increase in a calcination temperature for obtaining strength, an oxygen transfer rate may be decreased, or the oxygen carriers may not be regenerated to their initial state in an oxidation reaction in which the oxygen carriers are supposed to obtain oxygen from the air to be regenerated.

The titanium oxide may be industrial nickel oxide whose average particle size is in the range of greater than 0 to 5 μm. In such a range, sufficient strength suitable for use in a fluidized bed process may be obtained, and the degree of dispersion may be made more uniform.

The titanium oxide may have a purity of 95% or higher, e.g., a purity of 98% or higher. In such a range, the strength and oxygen transfer capacity of oxygen carriers may be further improved.

In a specific example, the raw material composition for preparing oxygen carriers may include nickel hydroxide, boehmite, and magnesium oxide or magnesium hydroxide. For example, the raw material composition for preparing oxygen carriers may include 55 weight % to 80 weight % nickel hydroxide, 15 weight % to 40 weight % boehmite, and 3 to 15 weight % magnesium oxide or magnesium hydroxide.

In another specific example, the raw material composition for preparing oxygen carriers may include nickel oxide and cerium hydroxide. For example, the raw material composition for preparing oxygen carriers may include 55 weight % to 75 weight % nickel oxide and 25 weight % to 45 weight % cerium hydroxide.

In still another example, the raw material composition for preparing oxygen carriers may include nickel hydroxide, boehmite, cerium oxide or cerium hydroxide, magnesium oxide or magnesium hydroxide, and titanium oxide. For example, the raw material composition for preparing oxygen carriers may include 55 weight % to 80 weight % nickel hydroxide, 5 weight % to 35 weight % boehmite, 3 weight % to 20 weight % cerium oxide or cerium hydroxide, 3 weight % to 15 weight % magnesium oxide or magnesium hydroxide, and 0 weight % to 15 weight % titanium oxide.

<Oxygen Carriers>

Another embodiment of the present invention relates to oxygen carriers containing nickel oxide which are formed from the above-described raw material composition for preparing oxygen carriers, the raw material composition including a first component which is one or more of nickel oxide and nickel hydroxide and a second component which is one or more of boehmite, cerium oxide, cerium hydroxide, magnesium oxide, magnesium hydroxide, and titanium oxide, wherein, when the first component is nickel oxide, the second component includes cerium hydroxide.

In this way, the oxygen carriers of the present invention have excellent oxygen transfer rate, oxygen transfer capacity, and durability due to compositions and structural characteristics of the used components. Also, when such oxygen carriers are applied to a CLC process and a CLC apparatus, oxygen carrier inventory and attrition loss may be reduced.

The oxygen carriers may be used for CLC of solid fuels as well as gas fuels and may also be effectively used in partial oxidation of a fuel, reforming of a fuel, and hydrogen preparation.

In addition, in the oxygen carriers of the present invention, since solid raw materials milled in an average size of 5 μm or smaller, e.g., in an average size of 1 μm or smaller, are stably and evenly dispersed in a slurry state, oxygen carriers which are finally obtained by calcination have excellent long-term durability, have a spherical shape, a particle size, a particle size distribution, a packing density, and a strength suitable for a fluidized bed process, and have a low calcination temperature and excellent oxygen transfer performance.

When such high-performance oxygen carriers are applied to the CLC process, $CO_2$ may be internally captured within the boiler while reducing a decrease in thermal efficiency of a system caused by $CO_2$ capture as compared with a conventional combustion method requiring separate $CO_2$ capture plant.

The oxygen carriers may be subjected to a attrition test for 5 hours at a flow rate of 10.00 l/min (273.15 K, 1 bar) according to ASTM D5757-95 using a attrition tester, and then a attrition index indicated using Equation 1 below may be 20% or lower, e.g., 18% or lower, 15% or lower, or 10% or lower.

$$AI(\%)=[(W2)/(W1)] \quad \text{[Equation 1]}$$

In Equation 1, W1 represents a weighting of a sample before the attrition test, and W2 represents a weight in g of fine particles captured during the 5 hours of the attrition test.

The lower limit of the attrition index is not particularly limited, and it is preferable that the lower limit be closer to 0%. In such a range, when the oxygen carriers are used in CLC, attrition loss is further reduced such that the quantity of oxygen carriers that should be supplemented during a process operation may be reduced, and a generation rate of a fine powder or the like generated during the process operation is lowered. These leads that the oxygen carriers have characteristics more advantageous for application to a circulating fluidized bed process or the like.

The oxygen carriers may have a shape of spherical non-blowholes, an average particle size in the range of 60 μm to 150 μm, a particle size distribution in the range of 30 μm to 400 μm, and a packing density in the range of 1.0 g/ml to 4.0 g/ml, e.g., in the range of 1.0 g/ml to 3.0 g/ml or in the range of 2.0 g/ml to 4.0 g/ml. In such a case, when the oxygen carriers are used in CLC, attrition loss is further reduced such that the quantity of oxygen carriers that should be supplemented during a process operation may be reduced, and a generation rate of a fine powder or the like generated during the process is lowered such that the oxygen carriers have characteristics more advantageous for application to a circulating fluidized bed process or the like.

The non-blowholes are spherical shapes excluding shapes including blowholes such as a dimple shape and a hollow shape.

Regarding the average particle size and particle size distribution of the oxygen carriers, the average particle size may be in the range of 60 μm to 150 μm, more specifically, in the range of 70 μm to 130 μm, and the particle size distribution may be in the range of 30 μm to 400 μm, more specifically, in the range of 38 μm to 350 μm.

An oxygen transfer capacity of the oxygen carriers may be in the range of 8 weight % to 25 weight %, specifically, 10 weight % to 25 weight %, and more specifically, 12.5 weight % to 20 weight %, based on the total weight of the oxygen carriers.

<Method of Preparing Oxygen Carriers>

Still another embodiment of the present invention relates to a method of preparing oxygen carriers, the method including: (A) preparing a slurry for preparing oxygen carriers by mixing a solvent with the above-described raw material composition for preparing oxygen carriers; (B) stirring the slurry to prepare a homogenized slurry; (C) spray-drying the homogenized slurry to form solid particles; and (D) drying and calcining the formed solid particles to prepare oxygen carriers.

The slurry for preparing the oxygen carriers may be prepared by mixing the above-described raw material composition for preparing oxygen carriers with the solvent.

The raw material composition for preparing oxygen carriers may include a first component which is one or more of nickel oxide and nickel hydroxide and a second component which is one or more of boehmite, cerium oxide, cerium hydroxide, magnesium oxide, magnesium hydroxide, and titanium oxide, wherein, when the first component is nickel oxide, the second component includes cerium hydroxide.

In a specific example, the raw material composition for preparing oxygen carriers may include nickel hydroxide, boehmite, and magnesium oxide or magnesium hydroxide. For example, the raw material composition for preparing oxygen carriers may include 55 weight % to 80 weight % nickel hydroxide, 15 weight % to 40 weight % boehmite, and 3 to 15 weight % magnesium oxide or magnesium hydroxide.

In another specific example, the raw material composition for preparing oxygen carriers may include nickel oxide and cerium hydroxide. For example, the raw material composition for preparing oxygen carriers may include 55 weight % to 75 weight % nickel oxide and 25 weight % to 45 weight % cerium hydroxide.

In still another example, the raw material composition for preparing oxygen carriers may include nickel hydroxide, boehmite, cerium oxide or cerium hydroxide, magnesium oxide or magnesium hydroxide, and titanium oxide. For example, the raw material composition for preparing oxygen carriers may include 55 weight % to 80 weight % nickel hydroxide, 5 weight % to 35 weight % boehmite, 3 weight % to 20 weight % cerium oxide or cerium hydroxide, 3 weight % to 15 weight % magnesium oxide or magnesium hydroxide, and 0 weight % to 15 weight % titanium oxide.

In the (A) preparing the slurry for preparing oxygen carriers, the slurry for preparing oxygen carriers is prepared by mixing the solvent with the above-described raw material composition for preparing oxygen carriers of the present invention.

The raw material composition for preparing oxygen carriers and the solvent may be mixed at a weight ratio of 15 to 60:40 to 85, e.g., 15 to 50:50 to 85 or 20 to 60:40 to 80. In such a range, the quantity of the solvent that should be evaporated during the spray-drying and the solid content in the slurry are maintained in an appropriate range. Therefore, a viscosity is maintained in an appropriate range such that fluidity is improved, milling is further facilitated during homogenization, and excellent preparation efficiency may be achieved.

Types of the solvent are not particularly limited, and any solvent commonly used in the art may be used as the solvent. Specifically, water may be used as the solvent. In such a case, operability and preparation efficiency may be further improved in the homogenization and calcination process.

In the (A) preparing the slurry for preparing oxygen carriers, the slurry may further include one or more additives of a dispersant, a defoamer, and an organic binder.

Specifically, the additives may be added to the above-described solvent in advance and then mixed with the raw material composition for preparing oxygen carriers. In such a case, dispersibility and mixability of the raw material composition for preparing oxygen carriers may be further improved.

The dispersant may prevent a phenomenon in which components included in the raw material composition for preparing oxygen carriers agglomerate during milling of the slurry which will be described below. Also, the dispersant may further improve efficiency of controlling particle sizes of raw material components constituting oxygen carriers in the homogenizing process.

Specifically, one or more of an anionic surfactant, a cationic surfactant, and a nonionic surfactant may be used as the dispersant. For example, the anionic surfactant may be poly-carboxylate ammonium salts, poly-carboxylate amine salts, or the like. In such a case, functions of controlling charges on a particle surface and controlling dispersion and agglomeration of the raw materials may be further improved by using the dispersant, and the slurry may be allowed to have a high solid content.

In addition, the dispersant may improve efficiency in which a formed prepart (oxygen carrier assembly), i.e., a green body, generated by spray-drying the slurry is prepared in a spherical shape excluding a donut shape, a dimple shape, and a blowhole shape.

The content of the dispersant may be 0.01 parts by weight to 5 parts by weight based on 100 parts by weight of the raw material composition for preparing oxygen carriers. In such a range, a dispersion effect of raw materials may be superior.

The defoamer may be used to remove foam of the slurry to which the dispersant and organic binder are applied.

Specifically, the defoamer may include one or more of a silicone-based defoamer, a metal soap-based defoamer, an amide-based defoamer, a polyether-based defoamer, a polyester-based defoamer, a polyglycol-based defoamer, and an alcohol-based defoamer. In such a case, compatibility of the defoamer may be superior.

The content of the defoamer may be 0.01 parts by weight to 1.0 parts by weight based on 100 parts by weight of the raw material composition for preparing oxygen carriers. In such a range, foam generation during the process of preparing the slurry may be reduced, the efficiency of preparing spherical oxygen carriers during the spray-drying may be further improved, and the content of residual ash after calcination may be reduced so that the oxygen transfer capacity is further improved. More specifically, the content of the defoamer may be increased or decreased according to a quantity of generated foam.

The organic binder may be added during the preparing the slurry to give plasticity and fluidity to the slurry and, ultimately, to give strength to oxygen carriers assembled by the spray-drying and forming. In this way, handling of the assembly, i.e., the green body, may be facilitated before pre-drying and calcination.

Specifically, one or more of a polyvinyl alcohol, polyethylene glycol, and methylcellulose may be used as the organic binder.

The content of the organic binder may be 1 part by weight to 5 weight % based on 100 weight % of the raw material composition for preparing oxygen carriers. In such a range, a binding force between solid particles formed by the spray-drying is improved such that a characteristic of maintaining the spherical shape before drying and calcination may be improved, and content of residual ash after calcination is reduced so that the oxygen transfer capacity is further improved.

In a specific example, the additives may include all of the dispersant, the defoamer, and the organic binder, and 0.01 to 5.0 parts by weight of the dispersant, 0.01 to 1.0 parts by weight of the defoamer, and 1.0 to 5.0 parts by weight of the organic binder based on 100 parts by weight of the raw material composition for producing oxygen carriers may be added as additives to the slurry. In such a case, it is advantageous for controlling the average particle size, particle size distribution, and shape of the oxygen carriers while further improving the oxygen transfer capacity of the oxygen carriers.

The slurry may be a fluidic colloidal slurry. In such a case, operability and preparation efficiency may be further improved in the homogenization and calcination process.

The (B) stirring of the slurry to prepare the homogenized slurry may include stirring the previously prepared slurry using a stirrer and milling the slurry to homogenize. In such a case, an ability to control homogenization characteristics of the slurry, the concentration, viscosity, stability, and fluidity of the slurry, and the strength, density, and the like of particles after the spray-drying may be further improved.

The stirring may be performed in a process in which components to be included in the mixture are being added to the mixture or may be performed after all of the components to be included in the mixture have been added to the mixture. In this case, for example, the stirring may be performed using a stirrer.

Specifically, the slurry prepared by mixing the solvent and/or the additives and the raw material composition for preparing oxygen carriers may be stirred and then milled using a mill. In this way, the particle size in the slurry may become several microns (μm) or less. Since particles milled in this process are more uniformly dispersed in the slurry, and agglomeration of the particles in the slurry is suppressed, a homogenized and stable slurry may be prepared.

The milling process may be repeated several times as necessary, and the dispersant and the defoamer may be added between individual milling processes to control fluidity of the slurry.

For example, a wet milling method may be used as a milling method. In such a case, the milling effect may be improved, and problems such as dust scattering that occurs during dry milling may be addressed. Meanwhile, when a particle diameter of the raw material composition is several microns or less, a separate milling process may also be omitted.

In the present invention, removing foreign substances from the stirred and milled slurry may be further performed. In this step, foreign substances or a lump of raw materials that may become a cause of nozzle blockage or the like during the spray drying may be removed. For example, the removal of foreign substances may be performed by sieving.

There is no particular limitation on fluidity of the homogenized slurry. The homogenized slurry may have any level of viscosity as long as the homogenized slurry may be fed through a pump.

The (C) spray-drying of the homogenized slurry to form the solid particles comprises pumping the homogenized slurry into a spray-dryer and spraying while maintaining an inlet air temperature in the range of 260° C. to 300° C. and an outlet air temperature in the range of 90° C. to 150° C. to form the solid particles.

The forming of the homogenized slurry into the solid particles may be performed using the spray-dryer. Specifically, the homogenized slurry may be fed to the spray-dryer through a pump, and then the fed slurry may be sprayed into the spray-dryer to form the solid particles.

Adding an organic binder may be advantageous for maintaining the spherical shape of the particles during the spray-drying step.

Operational conditions commonly used in the art may be applied for forming the oxygen carriers using the spray-dryer.

More specifically, the oxygen carriers may be formed by spraying the fluidic homogenized slurry using a countercurrent flow type spraying method in which the fluidic homogenized slurry is sprayed through a centrifugal pressure nozzle in a direction opposite to the flow of drying air.

In this case, the inlet air temperature of the dryer may be maintained in the range of 260° C. to 300° C., and the outlet air temperature thereof may be maintained in the range of 90° C. to 150° C. In such temperature ranges, the efficiency of preparing spherical oxygen carriers may be further improved.

The (D) drying and calcining the formed solid particles to prepare oxygen carriers may include drying the formed solid particles at 110° C. to 150° C. for 2 to 24 hours, putting the dried solid particles in a calcination furnace, and elevating a temperature therein to a temperature in the range of 1000°

C. to 1450° C. at a rate in the range of 1° C./min to 5° C./min to calcine the dried solid particles for 2 to 10 hours.

When the drying is performed under the above temperature and time conditions, cracking by moisture expansion during calcination may be prevented. In this case, the drying may be performed in an air atmosphere.

When the drying is completed, the dried particles may be put in the calcination furnace, the final calcination temperature may be elevated to a temperature in the range of 1000° C. to 1450° C., e.g., in the range of 1000° C. to 1250° C., 1100° C. to 1300° C., or 1350° C. to 1450° C., and then the dried particles may be calcined for 2 to 10 hours, e.g., 3 to 10 hours. In such a calcination time range, it is possible to prevent weakening of the strength of the particles or an excessive increase in calcination costs. In such a case, due to the calcination, organic additives (dispersant, defoamer, and organic binder) added during the preparing the slurry are combusted, and binding occurs between the raw materials such that the strength of the particles is improved. Also, in the above calcination temperature range, the oxygen transfer capacity may be sufficiently improved while a decrease in the strength of the oxygen carriers by an insufficient calcination temperature is prevented.

More specifically, the calcination may be performed using a method in which a stagnation interval of 30 minutes or more is assigned at each of two or more stages of constant temperatures until the final calcination temperature is reached. In such a case, destruction of the shape of particles due to moisture evaporation and a gas generated by combustion of organic additives inside the oxygen carriers may be prevented.

The calcination may be performed using a calcination furnace such as a muffle furnace, a tubular furnace, or a kiln.

Hereinafter, the present invention will be described in more detail using examples according to the present invention and comparative examples with reference to the accompanying drawings so that those of ordinary skill in the art to which the present invention pertains may easily practice the present invention. However, the scope of the present invention is not limited to the examples given below.

FIG. 1 is a process chart schematically illustrating an oxygen carrier preparing method (S100) using the oxygen carrier raw material composition according to the present invention. As illustrated in FIG. 1, the oxygen carrier preparing method includes (A) mixing a solvent with the raw materials for preparing oxygen carriers; (B) preparing a homogenized slurry by milling and dispersing a slurry prepared by the mixing; (C) spray-drying the homogenized slurry to form solid particles; and (D) drying and calcining the formed and prepared solid particles (green body of the oxygen carriers) to prepare the oxygen carriers.

FIG. 2 is a process chart illustrating an exemplary process of preparing a mixture of a raw material composition and water into a slurry. As illustrated in FIG. 2, preparing a slurry may include adding an additive to water (S11), mixing solid raw materials with the water (S12), adding organic additives to the mixture (S21), and milling and dispersing a slurry prepared by the mixing to homogenize the slurry and prepare a dispersed slurry (S22) and may further include removing foreign substances included in the slurry (S23).

FIG. 3 is a process chart illustrating an exemplary process of forming oxygen carriers by spray-drying a slurry. As illustrated in FIG. 3, forming oxygen carriers by spray-drying a slurry (S30) may include feeding the slurry to a spray-dryer (S31) and forming oxygen carriers by spraying the fed slurry into hot air chamber of the spray-dryer (S32).

FIG. 4 is a process chart illustrating a process of preparing the final oxygen carriers by drying and calcining a green body of the oxygen carriers formed using the spray-drying method. As illustrated in FIG. 4, the green body of the formed oxygen carriers may be subjected to a preliminary drying process (S41) and then prepared into the final oxygen carriers through a calcination process (S42).

<Chemical Looping Combustion (CLC) Method>

Yet another embodiment of the present invention relates to a chemical looping combustion (CLC) method including contacting the above-described oxygen carriers with a fuel so that the oxygen carriers are reduced and the fuel is combusted, and contacting the reduced oxygen carriers with oxygen so that the oxygen carriers are regenerated.

Here, the fuel is not particularly limited, and any of a solid fuel, a liquid fuel, and a gas fuel may be used as the fuel. Preferably, the fuel may be a gas fuel. The gas fuel used in the present invention is not particularly limited. For example, the fuel may be one or more selected from the group consisting of methane, hydrogen, carbon monoxide, alkanes ($C_nH_{2n+2}$), liquefied natural gas (LNG), and synthetic gas (syngas).

A schematic diagram of the CLC method of the present invention is shown in FIG. 5.

When the oxygen carriers are reacted with a fuel, the oxygen carriers are reduced while transferring oxygen to the fuel and $CO_2$ and water are emitted. The reduced oxygen carriers are oxidized and regenerated when reacted with oxygen again. In the CLC method of the present invention, the above process is repeated. Also, oxygen may be provided to the reduced oxygen carriers by contacting the reduced oxygen carrier with air.

When the oxygen carriers of the present invention are applied to the CLC process, $CO_2$ may be internally captured within the boiler while reducing a decrease in thermal efficiency of a system caused by $CO_2$ capture as compared with a conventional combustion method requiring separate $CO_2$ capture plant. In addition, since $CO_2$ is not captured using a solution in the CLC process, the CLC process has advantages in that the amount of water used is small and there is almost no generation of waste water.

In addition, such a CLC method (CLC process) may be performed using a CLC apparatus including a fuel reactor configured to cause oxygen carriers to react with a fuel so that the oxygen carriers are reduced and the fuel is combusted; and an air reactor configured to cause the reduced oxygen carriers to react with oxygen so that the reduced oxygen carriers are oxidized.

Specifically, in the fuel reactor, metal oxides ($M_xO_y$) in the oxygen carriers react with a fuel and become metal oxides ($M_xO_{y-1}$) in a reduced state, and fuel is combusted. The reduced oxygen carriers move to the air reactor so that the reduced oxygen carriers react with oxygen in the air and are oxidized again. The oxidized oxygen carriers are circulated to the fuel reactor and repeat the above process.

The reactions in the fuel reactor and the air reactor are shown in Reaction Formulas 1 and 2. Reaction Formula 1 below shows the reaction in the fuel reactor, and Reaction Formula 2 below shows the reaction occurring in the air reactor.

$$4M_xO_y + CH_4 \rightarrow 4M_xO_{y-1} + 2H_2O + CO_2 \quad \text{<Reaction Formula 1>}$$

$$M_xO_{y-1} + 0.5O_2 \rightarrow M_xO_y \quad \text{<Reaction Formula 2>}$$

In Reaction Formulas 1 and 2, M represents a metal, and X and Y represent proportions occupied by each element in metal oxide molecules.

Although an example in which a single oxygen atom O is transferred from a single metal oxide molecule is shown in Reaction Formulas 1 and 2, less than one or more than one oxygen atom may also be transferred, and in this case, Reaction Formulas 1 and 2 may be changed to correspond to the number of transferred oxygen atoms.

EXAMPLES

Hereinafter, the configurations and actions of the present invention will be described in more detail using preferred examples of the present invention. However, the examples given below are merely some of the examples of the present invention, and the present invention should not be limitedly interpreted in any way according to the examples below.

Since description not described herein may be technically inferred sufficiently easily by those of ordinary skill in the art, description thereof will be omitted.

Example 1

$Ni(OH)_2$ (purity of 98% or higher, powder form), boehmite (AlOOH) in a powder form (purity of 99% or higher, average particle size of 1 μm or less when dispersed in a solvent), and MgO (powder form, average particle size of 5.5 μm, purity of 97% or higher) were prepared. As shown in Table 1, each material was weighed (5.72 kg of $Ni(OH)_2$, 2.0 kg of AlOOH, 0.34 kg of $Mg(OH)_2$) corresponding to a composition ratio (70 weight % $Ni(OH)_2$, 25.8 weight % AlOOH, 4.2 weight % $Mg(OH)_2$) of oxygen carriers to be prepared (final weight after calcination at high temperature is 8 kg), so that the raw material composition was prepared.

A dispersant (anionic surfactant) and a defoamer (metal soap-based) were added to 40 L of distilled water and then mixed using a stirrer. The raw material composition was added to the water mixed with organic additives. Then, to prepare a mixed slurry, the mixture was mixed on it. The mixed slurry was milled over 3 times using a high energy ball mill. To facilitate milling in the milling process, water and the above-described organic additives were further added when necessary after the first milling. After the second milling, polyethylene glycol was added, and the third milling was performed to prepare a stable and homogenized fluidic colloidal slurry. Foreign substances were removed from the milled slurry by sieving, and a solid concentration in the final slurry was measured. The total amount of added additives and the measured solid concentration in the final slurry are shown in Table 1 below.

The prepared colloidal slurry was fed to a spray-dryer through a pump and was subjected to spray-drying to form the colloidal slurry into oxygen carriers. An assembly, i.e., a green body, of the oxygen carriers formed and prepared in this way was pre-dried for 12 hours in a dry oven at a 120° C. under air atmosphere and then was calcined for 5 hours at a 1300° C. in a calcination furnace to prepare oxygen carriers. Before reaching the final calcination temperature, a constant temperature zones were assigned at 200° C., 300° C., 400° C., 500° C., 650° C., 800° C., and 950° C. for about 1 hour, and a temperature elevation rate was about 5° C./min.

Examples 2 to 8

In Examples 2 to 8, oxygen carriers were prepared using the same method as in Example 1 except that components and contents were changed as shown in Table 1 below.

In addition, in Examples 2, 4, 6, and 8, an initial amount of water added was changed to 35 L, and boehmite in the form of a sol was used.

In addition, in Examples 3, 4, 7, and 8, $Mg(OH)_2$ (powder form, average particle diameter of 4.5 μm, purity of 98.5% or higher) was used instead of magnesia.

In addition, in Examples 5, 6, 7, and 8, raw materials were weighed and used so that 8.4 parts by weight of a magnesium-giving raw material in the form of MgO was included based on 100 parts by weight of a dried raw material sample assuming $H_2O$ was discharged by high-temperature calcination.

TABLE 1

| Component | Example 1 | Example 2 | Example 3 | Example 4 | Example 5 | Example 6 | Example 7 | Example 8 |
|---|---|---|---|---|---|---|---|---|
| Nickel hydroxide ($Ni(OH)_2$) | 70 | 70 | 70 | 70 | 70 | 70 | 70 | 70 |
| Nickel oxide (NiO) | — | — | — | — | — | — | — | — |
| Boehmite (AlOOH) in form of powder | 25.8 | — | 25.8 | — | 21.6 | — | 21.6 | — |
| Boehmite (AlOOH) in form of sol | — | 25.8 | — | 25.8 | — | 21.6 | — | 21.6 |
| Magnesium oxide (MgO) | 4.2 | 4.2 | — | — | 8.4 | 8.4 | — | — |
| Magnesium hydroxide ($Mg(OH)_2$) | — | — | 4.2 | 4.2 | — | — | 8.4 | 8.4 |
| Cerium hydroxide ($Ce(OH)_4$) | — | — | — | — | — | — | — | — |
| Cerium oxide ($CeO_2$) | — | — | — | — | — | — | — | — |
| Titanium oxide ($TiO_2$) | — | — | — | — | — | — | — | — |
| Total solid content | 100 | 100 | 100 | 100 | 100 | 100 | 100 | 100 |
| Dispersant | 2.6 | 2.7 | 1.6 | 1.7 | 1.7 | 1.7 | 1.6 | 1.7 |
| Defoamer | 0.6 | 0.6 | 0.6 | 0.7 | 0.7 | 0.7 | 0.6 | 0.7 |
| Organic binder | 3.1 | 3.2 | 3.2 | 3.4 | 3.3 | 3.4 | 3.2 | 3.3 |

TABLE 1-continued

| Component | Example 1 | Example 2 | Example 3 | Example 4 | Example 5 | Example 6 | Example 7 | Example 8 |
|---|---|---|---|---|---|---|---|---|
| Solid concentration in slurry | 17 | 19.8 | 18.9 | 18.4 | 18.4 | 19.5 | 18 | 16.7 |

(In Table 1 above, a unit of each component included in oxygen carriers is parts by weight and is based on solid samples. The content of nickel hydroxide or nickel oxide is based on the form of NiO after drying and calcination. The content of boehmite in the form of a powder or sol is based on the form of $Al_2O_3$ after drying and calcination. The content of magnesium hydroxide or magnesium oxide is based on the form of MgO after drying and calcination.)

Comparative Examples 1 to 5

In Comparative Examples 1 to 5, oxygen carriers were prepared using the same method as in Example 1 except that components and contents were changed as shown in Table 2 below. In addition, nickel oxide (NiO) was used as an active raw material that exchanges oxygen.

In addition, to compare performance of particles exhibited when oxygen carriers are prepared by using the raw support materials of the prior art which use alumina and magnesium-containing raw materials with performance of particles in Examples of the present invention, raw material compositions of Comparative Examples 1 to 5 were designed by selecting gamma alumina, alpha alumina, magnesia, and magnesium aluminate and using combinations thereof.

TABLE 2

| Component | Comparative Example 1 | Comparative Example 2 | Comparative Example 3 | Comparative Example 4 | Comparative Example 5 |
|---|---|---|---|---|---|
| Nickel hydroxide (Ni(OH)$_2$) | — | — | — | — | — |
| Nickel oxide (NiO) | 70 | 70 | 70 | 70 | 70 |
| Boehmite (AlOOH) in form of powder | — | — | — | — | — |
| Boehmite (AlOOH) in form of sol | — | — | — | — | — |
| Gamma alumina (γ-Al$_2$O$_3$) | — | — | 25.8 | 21.6 | — |
| Alpha alumina (α-Al$_2$O$_3$) | 25.8 | 21.6 | — | — | — |
| Magnesium oxide (MgO) | 4.2 | 8.4 | 4.2 | 8.4 | — |
| Magnesium hydroxide (Mg(OH)$_2$) | — | — | — | — | — |
| Magnesium aluminate (MgAl$_2$O$_4$) | — | — | — | — | 30 |
| Cerium hydroxide (Ce(OH)$_4$) | — | — | — | — | — |
| Cerium oxide (CeO$_2$) | — | — | — | — | — |
| Titanium oxide (TiO$_2$) | — | — | — | — | — |
| Total solid content | 100 | 100 | 100 | 100 | 100 |
| Dispersant | 0.2 | 0.3 | 0.3 | 0.3 | 0.2 |
| Defoamer | 0.1 | 0.2 | 0.2 | 0.2 | 0.1 |
| Organic binder | 3.0 | 3.0 | 3.0 | 3.0 | 3.8 |
| Solid concentration in slurry | 35.3 | 54.4 | 35.5 | 40.0 | 60.4 |

(In Table 2, a unit of each component included in oxygen carriers is parts by weight and is based on solid samples.)

Comparative Examples 6 to 13

In Comparative Examples 6 to 13, oxygen carriers were prepared using the same method as in Example 1 except that components and contents were changed as shown in Table 3 below.

In addition, in Comparative Examples 1, 3, 6, 7, 8, and 9 of Comparative Examples 1 to 13, a content of magnesium containing raw materials was controlled so that a magnesium content in the final oxygen carriers after calcination was maintained at the same level as in Examples 1, 2, 3, and 4 (Mg content: about 2.5 parts by weight). In Compara- Examples 2, 4, 5, 10, 11, 12, and 13, a content of magnesium containing raw materials was controlled so that a magnesium content in the final oxygen carriers after calcination was maintained at the same level as in Examples 5, 6, 7, and 8 (Mg content: about 5.1 parts by weight).

To prepare $CeO_2$ support material-based NiO-based oxygen carriers, industrial NiO (purity of 98% or higher, powder form, average particle diameter of 1 µm or less) and $Ce(OH)_4$ (powder form, average particle diameter of 1 µm or less, purity of 99% or higher) were prepared.

TABLE 3

(Unit: parts by weight)

| | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|
| Nickel oxide (NiO) | 70 | 70 | 70 | 70 | 70 | 70 | 70 | 70 |
| Boehmite (AlOOH) in form of powder | 25.8 | — | 25.8 | — | 21.6 | — | 21.6 | — |
| Boehmite (AlOOH) in form of sol | — | 25.8 | — | 25.8 | — | 21.6 | — | 21.6 |
| Gamma alumina ($\gamma$-$Al_2O_3$) | — | — | — | — | — | — | — | — |
| Alpha alumina ($\alpha$-$Al_2O_3$) | — | — | — | — | — | — | — | — |
| Magnesia (MgO) | 4.2 | 4.2 | — | — | 8.4 | 8.4 | — | — |
| Magnesium hydroxide ($Mg(OH)_2$) | — | — | 4.2 | 4.2 | — | — | 8.4 | 8.4 |
| Magnesium aluminate ($MgAl_2O_4$) | — | — | — | — | — | — | — | — |
| Total solid content | 100 | 100 | 100 | 100 | 100 | 100 | 100 | 100 |
| Dispersant | 0.7 | 0.8 | 1.3 | 1.3 | 1.4 | 0.6 | 1.3 | 1.0 |
| Defoamer | 0.4 | 0.4 | 0.5 | 0.4 | 0.4 | 0.4 | 0.5 | 0.5 |
| Organic binder | 2.9 | 3.0 | 2.8 | 2.9 | 2.9 | 3.0 | 2.8 | 2.9 |
| Solid concentration in slurry | 22.5 | 21.5 | 25.5 | 23.7 | 25.7 | 24.9 | 26.4 | 24.4 |

(In Table 3 above, a unit of each component included in oxygen carriers is parts by weight and is based on solid samples. The content of boehmite in the form of a powder or sol is based on the form of $Al_2O_3$ after drying and calcination. The content of magnesium hydroxide is based on the form of MgO after drying and calcination.)

Example 9

Example 9 is an example related to preparation of NiO-based oxygen carriers using NiO, which is an active component, as a raw material for producing NiO-based oxygen carriers and using $Ce(OH)_4$ in the form of a powder as a raw support material for enhancing dispersion of NiO, giving strength, and enhancing an oxygen transfer reaction.

$Ce(OH)_4$ becomes $CeO_2$ as water ($H_2O$) is discharged therefrom during calcination at a high temperature. The raw material composition for preparing oxygen carriers of Example 1 was designed so that 70 weight % nickel oxide (NiO) and 30 parts by weight $CeO_2$ were included based on 100 parts by weight of a dried raw material sample assuming $H_2O$ was discharged by high-temperature calcination.

More specifically, the oxygen carriers of Example 9 were prepared using the method below.

To prepare $CeO_2$ support material-based NiO-based oxygen carriers, 7.0 kg of industrial nickel oxide (NiO) and 3.63 kg of cerium hydroxide ($Ce(OH)_4$) were weighed (65.85 weight % NiO and 34.15 weight % ($Ce(OH)_4$)) to prepare a raw material composition so that the total weight of oxygen carriers after the final calcination was 10 kg. A dispersant (anionic surfactant) and a defoamer (metal soap-based) were added to 12 l of water and then mixed with a stirrer. The raw material composition was added to the water mixed with organic additives. Then, to prepare a mixed slurry, the mixture was mixed on it. The mixed slurry was milled over 3 times using a high energy ball mill. To facilitate milling in the milling process, polyethylene glycol was added after the second milling, and the third milling was performed to prepare a stable and homogenized fluidic colloidal slurry. Foreign substances were removed from the milled slurry by sieving, and a solid concentration in the final slurry was measured. The total amount of added additives and the measured solid concentration in the final slurry are shown in the table below.

The prepared colloidal slurry was fed to a spray-dryer through a pump and was subjected to spray-drying to form the colloidal slurry into oxygen carriers. An assembly, i.e., a green body, of the oxygen carriers formed and prepared in this way was pre-dried for 12 hours in a dry oven at a 120° C. under air atmosphere and then was calcined for 5 hours at a 1400° C. in a calcination furnace to prepare oxygen carriers. Before reaching the final calcination temperature, a constant temperature zones were assigned at 200° C., 300° C., 400° C., 500° C., 650° C., 800° C., and 110° C. for about 1 hour, and a temperature elevation rate was about 5° C./min.

Comparative Examples 14 to 17

In Comparative Examples 14 to 17, oxygen carriers were prepared using the same method as in Example 9 except that components and contents were changed as shown in Table 4 below. In addition, the raw material composition for preparing oxygen carriers of Comparative Examples 14 to 17 was designed so that 70 weight % nickel oxide (NiO) was included based on 100 parts by weight of a dried raw material sample assuming $H_2O$ was discharged by high-temperature calcination.

TABLE 4

| | | | | | (Unit: parts by weight) |
| --- | --- | --- | --- | --- | --- |
| | Example 9 | Comparative Example 14 | Comparative Example 15 | Comparative Example 16 | Comparative Example 17 |
| Nickel oxide (NiO) | 70 | 70 | 70 | 70 | 70 |
| Gamma alumina ($\gamma$-$Al_2O_3$) | — | 30 | — | — | — |
| Alpha alumina ($\alpha$-$Al_2O_3$) | — | — | 30 | — | — |
| Magnesium aluminate ($MgAl_2O_4$) | — | — | — | 30 | — |
| Cerium oxide (CeO) | — | — | — | — | 30 |
| Cerium hydroxide ($Ce(OH)_4$) | 30 | — | — | — | — |
| Total solid content | 100 | 100 | 100 | 100 | 100 |
| Dispersant | 1.5 | 0.2 | 0.2 | 0.2 | 1.0 |
| Defoamer | 0.3 | 0.1 | 0.1 | 0.1 | 0.4 |
| Organic binder | 2.4 | 1.3 | 2.4 | 3.8 | 3.0 |
| Solid concentration in slurry | 40.2 | 34.0 | 75.5 | 60.4 | 58.9 |

(In Table 4 above, a unit of each component included in oxygen carriers is parts by weight and is based on solid samples. The content of cerium hydroxide is based on the form of $CeO_2$ after drying and calcination.)

Example 10

Example 10 is an example related to preparation of Ni-based oxygen carriers using $Ni(OH)_2$ for providing NiO, which is an active component, as a raw material for producing Ni-based oxygen carriers and using boehmite (AlOOH) in the form of a sol as a raw support material for enhancing dispersion of NiO and giving strength, using $Ce(OH)_4$ in the form of a powder as a raw support material for enhancing dispersion of NiO and an oxygen transfer reaction, using $Mg(OH)_2$ as a raw support material for giving a magnesium component for suppressing particle agglomeration during a continuous reaction cycle of oxidation-reduction, and using $TiO_2$ as a raw material for enhancing physical properties through lowering a calcination temperature of oxygen carriers.

$NiO_2$, AlOOH, $Ce(OH)_4$, and $Mg(OH)_2$ become NiO, $Al_2O_3$, $CeO_2$, and MgO, respectively, as water ($H_2O$) is discharged therefrom during calcination. In an example, the raw material composition was designed so that 70 parts by weight NiO, 5 parts by weight MgO, 5 to 15 parts by weight $CeO_2$, and 0 to 10 parts by weight $TiO_2$ were included based on 100 parts by weight of a dried raw material sample assuming $H_2O$ was discharged by high-temperature calcination, wherein $Al_2O_3$ made up the remainder in parts by weight.

More specifically, oxygen carriers of Example 10 were prepared using the method below.

To prepare Ni-based oxygen carriers, industrial $Ni(OH)_2$ (purity of 98% or higher, powder form), boehmite (AlOOH) in the form of a sol (in boehmite in the form of a sol whose solvent was water, the content of boehmite (AlOOH) in the form of the sol was 20 parts by weight in the form of alumina ($Al_2O_3$) when the sol was dried and calcined), $Mg(OH)_2$ (powder form, average particle diameter of 4.5 μm, purity of 98.5% or higher), $Ce(OH)_4$ (powder form, average particle diameter of 1 μm or less, purity of 99% or higher), and $TiO_2$ (powder form, average particle diameter of 1 μm or less, purity of 95% or higher) were prepared.

Each of the raw materials was weighed according to a composition ratio of the final Ni-based oxygen carriers to be prepared (so that the final weight after calcination was 5 kg). $Ni(OH)_2$, AlOOH, $Ce(OH)_4$, and $Mg(OH)_2$ were weighed so that NiO, $Al_2O_3$, $CeO_2$, MgO, and $TiO_2$ were respectively included at 70 parts by weight, 15 parts by weight, 10 parts by weight, and 5 parts by weight after calcination. A dispersant (anionic surfactant) and a defoamer (metal soap-based) were added to 25 l of water and then mixed with a stirrer. The raw material composition was added to the water mixed with organic additives. Then, to prepare a mixed slurry, the mixture was mixed on it.

The mixed slurry was milled over 3 times using a high energy ball mill. To facilitate milling in the milling process, water and the above-described organic additives were further added when necessary after the first milling. After the second milling, polyethylene glycol was added, and the third milling was performed to prepare a stable and homogenized fluidic colloidal slurry. Foreign substances were removed from the milled slurry by sieving, and a solid concentration in the final slurry was measured. The total amount of added additives and the measured solid concentration in the final slurry are shown in Table 5 below.

The prepared colloidal slurry was fed to a spray-dryer through a pump and was subjected to spray-drying to form the colloidal slurry into oxygen carriers. An assembly, i.e., a green body, of the oxygen carriers formed and prepared in this way was pre-dried for 12 hours in a dry oven at a 120° C. under air atmosphere and then was calcined for 5 hours at a temperature range of 1000° C. to 1200° C. in a calcination furnace to prepare oxygen carriers. Before reaching the final calcination temperature, a constant temperature zones were assigned at 200° C., 300° C., 400° C., 500° C., 650° C., 800° C., and 950° C. for about 1 hour, and a temperature elevation rate was about 5° C./min.

Examples 11 to 15

In Examples 11 to 15, oxygen carriers were prepared using the same method as in Example 10 except that an initial amount of water added was 20 L, $TiO_2$ was added in Examples 14 and 15, and the raw material compositions were changed as shown in Table 5 below.

TABLE 5

| Component | Example 10 | Example 11 | Example 12 | Example 13 | Example 14 | Example 15 |
|---|---|---|---|---|---|---|
| Nickel hydroxide (Ni(OH)$_2$) | 70 | 70 | 70 | 70 | 70 | 70 |
| Nickel oxide (NiO) | — | — | — | — | — | — |
| Boehmite (AlOOH) in form of powder | — | — | — | — | — | — |
| Boehmite (AlOOH) in form of sol | 15 | 20 | 10 | 15 | 10 | 10 |
| Magnesium oxide (MgO) | — | — | — | — | — | — |
| Magnesium hydroxide (Mg(OH)$_2$) | 5 | 5 | 5 | 5 | 5 | 5 |
| Cerium hydroxide (Ce(OH)$_4$) | 10 | 5 | 15 | 5 | 10 | 5 |
| Cerium oxide (CeO$_2$) | — | — | — | — | — | — |
| Titanium oxide (TiO$_2$) | — | — | — | 5 | 5 | 10 |
| Total solid content | 100 | 100 | 100 | 100 | 100 | 100 |
| Dispersant | 0.8 | 0.8 | 0.8 | 0.8 | 0.8 | 0.8 |
| Defoamer | 0.4 | 0.4 | 0.4 | 0.4 | 0.4 | 0.4 |
| Organic binder | 3 | 3 | 3 | 3 | 3 | 3 |
| Solid concentration in slurry | 18.5 | 19.8 | 21.8 | 20.7 | 22.1 | 21.2 |

(In Table 5 above, a unit of each component included in oxygen carriers is parts by weight and is based on solid samples. The content of nickel hydroxide is based on the form of NiO after drying and calcination. The content of boehmite in the form of a sol is based on the form of $Al_2O_3$ after drying and calcination. The content of magnesium hydroxide is based on the form of MgO after drying and calcination. The content of cerium hydroxide is based on the form of $CeO_2$ after drying and calcination.)

Comparative Examples 18 and 19

In Comparative Examples 18 to 19, oxygen carriers were prepared using the same method as in Example 1 except that compositions were changed as shown in Table 6 below.

TABLE 6

| Component | Comparative Example 18 | Comparative Example 19 |
|---|---|---|
| Nickel hydroxide (Ni(OH)$_2$) | 70 | 70 |
| Nickel oxide (NiO) | | |
| Boehmite (AlOOH) in form of powder | — | — |
| Boehmite (AlOOH) in form of sol | — | — |
| Gamma alumina ($\gamma$-$Al_2O_3$) | 25.8 | — |
| Alpha alumina ($\alpha$-$Al_2O_3$) | — | 25.8 |

TABLE 6-continued

| Component | Comparative Example 18 | Comparative Example 19 |
|---|---|---|
| Magnesium oxide (MgO) | — | — |
| Magnesium hydroxide (Mg(OH)$_2$) | 4.2 | 4.2 |
| Magnesium aluminate (MgAl$_2$O$_4$) | — | — |
| Cerium hydroxide (Ce(OH)$_4$) | — | — |
| Cerium oxide (CeO$_2$) | — | — |

TABLE 6-continued

| Component | Comparative Example 18 | Comparative Example 19 |
|---|---|---|
| Titanium oxide (TiO$_2$) | — | — |
| Total solid content | 100 | 100 |
| Dispersant | 1.0 | 1.0 |
| Defoamer | 0.1 | 0.1 |
| Organic binder | 3 | 3 |
| Solid concentration in slurry | 23.0 | 25.4 |

<Evaluation on Physical Properties>

(1) Measurement of Shapes of Oxygen Carriers

Shapes of oxygen carriers prepared in Examples and Comparative Examples were investigated using an industrial microscope, and results are shown in Tables 7 to 11 below.

(2) Measurement of Average Particle Size and Particle Size Distribution

The average particle size and particle size distribution of oxygen carriers were calculated by classifying 10 g of sample for 30 minutes using MEINZER-II Shaker and a standard size on the basis of ASTM E-11 from the American Society for Testing Materials (ASTM).

(3) Measurement of Packing Density

The packing density of oxygen carriers was measured using AutoTap (Quantachrome), which is an apparatus to measure packing density based on ASTM D4164-88.

(4) Measurement of Attrition Resistance

The attrition resistance of oxygen carriers was measured using a attrition tester according to ASTM D5757-95. A attrition index (AI) was determined at 10 std L/min (standard volume per minute) over 5 hours following the ASTM method described above, and the attrition index represents a ratio of a fine powder generated over 5 hours. A lower attrition index (AI) indicates that a mechanical strength of particles is stronger. A attrition index (AI) of AkzoFCC (Fluid Catalytic Cracking) catalyst used by oil companies that was measured using the same method for comparison was 22.5%.

(5) Measurement of Oxygen Transfer Performance

The oxygen transfer performance of the oxygen carriers prepared in the above examples was evaluated using thermogravimetric analysis (TGA). In the above examples and comparative examples, a mixture of 15 vol % CH$_4$ and 85 vol % CO$_2$ was used as a composition of a reaction gas used for a reduction reaction of oxygen carriers, and air was used as a reaction gas for oxidizing the reduced oxygen carriers. 100% nitrogen was supplied between an oxidation reaction and a reduction reaction to prevent direct contact between fuel and air in a reactor. An amount of oxygen carrier sample used in the experiment was about 30 mg. A flow rate of each reaction gas was 300 ml/min (based on 273.5 K, 1 bar), and the oxidation/reduction reaction was repeatedly performed at least 10 times or more at 850° C. The oxygen transfer capacity was calculated from a difference between weights of oxidized and reduced oxygen carriers. The oxygen transfer capacity is an amount of oxygen transferred to a fuel by the oxygen carriers and is a value obtained by dividing a weight change amount, which is obtained by subtracting a weight of oxygen carriers measured at the end of a reduction reaction of the oxygen carriers from a weight of completely oxidized oxygen carriers, by the weight of completely oxidized oxygen carriers, wherein the value is indicated in percentage by weight.

TABLE 7

| | Calcination temperature (° C.) | Shape | Average particle size (μm) | Particle size distribution (μm) | Packing density (g/ml) | Attrition index AI (%) | Oxygen transfer capacity (weight %) |
|---|---|---|---|---|---|---|---|
| Example 1 | 1100 | Spherical | 87 | 37~302.5 | 1.4 | 16.7 | 14.8 |
| | 1200 | | 73 | 37~302.5 | 2.8 | 5.4 | 12.8 |
| Example 2 | 1100 | Spherical | 97 | 37~302.5 | 1.5 | 12.0 | 14.6 |
| | 1200 | | 75 | 37~302.5 | 2.3 | 3.6 | 12.9 |
| Example 3 | 1100 | Spherical | — | — | — | 38.7 | — |
| | 1200 | | 65 | 37~196 | 1.9 | 6.6 | 14.7 |
| Example 4 | 1100 | Spherical | 72 | 41.5~231 | 1.5 | 11.1 | 14.2 |
| | 1200 | | 67 | 37~231 | 2.2 | 3.5 | 14.3 |
| Example 5 | 1100 | Spherical | — | — | — | 55.8 | — |
| | 1200 | | 74 | 37~196 | 1.8 | 6.8 | 13.8 |
| Example 6 | 1100 | Spherical | — | — | — | 29.2 | — |
| | 1200 | | 68 | 37~196 | 2.0 | 5.3 | 13.0 |
| Example 7 | 1100 | Spherical | — | — | — | 60.6 | — |
| | 1200 | | 75 | 37~231 | 1.8 | 9.6 | 13.7 |
| | 1250 | | 67 | 37~196 | 2.4 | 5.1 | 13.3 |
| Example 8 | 1100 | Spherical | — | — | — | 61.4 | — |
| | 1200 | | 82 | 37~302.5 | 1.7 | 14.3 | 13.3 |
| | 1300 | | 81 | 37~302.5 | 2.5 | 5.6 | 12.6 |

TABLE 8

| | Calcination temperature (° C.) | Shape | Average particle size (μm) | Particle size distribution (μm) | Packing density (g/ml) | Attrition index AI (%) | Oxygen transfer capacity (weight %) |
|---|---|---|---|---|---|---|---|
| Comparative Example 1 | 1400 | Spherical | | — | | 73.6 | — |
| | 1500 | | 87 | 37~302.5 | 2.4 | 7.4 | 12.1 |

TABLE 8-continued

| | Calcination temperature (° C.) | Shape | Average particle size (μm) | Particle size distribution (μm) | Packing density (g/ml) | Attrition index AI (%) | Oxygen transfer capacity (weight %) |
|---|---|---|---|---|---|---|---|
| Comparative Example 2 | 1400 | Spherical | — | — | — | 44.1 | — |
| | 1500 | | 106 | 41.5~302.5 | 2.9 | 2.0 | Incomplete regeneration |
| Comparative Example 3 | 1200 | Spherical | — | — | — | 60.4 | — |
| | 1350 | | 91 | 41.5~302.5 | 2.6 | 16.7 | 12.3 |
| | 1400 | | 90 | 41.5~302.5 | 2.8 | 0.4 | 12.2 |
| Comparative Example 4 | 1200 | Spherical | — | — | — | 47.2 | — |
| | 1300 | | 90 | 41.5~302.5 | 2.8 | 17.9 | Incomplete regeneration |
| | 1400 | | 84 | 41.5~231 | 2.7 | 1.7 | Incomplete regeneration |
| Comparative Example 5 | 1300 | Spherical | — | — | — | 50.7 | — |
| | 1400 | | 99 | 41.5~231 | 2.6 | 22.1 | — |
| | 1500 | | 98 | 41.5~231 | 2.6 | 22.0 | — |
| Comparative Example 6 | 1350 | Spherical | — | — | — | 48.1 | — |
| | 1400 | | 113 | 41.5~302.5 | 3.0 | 7.3 | 12.2 |
| Comparative Example 7 | 1400 | Spherical | — | — | — | 22.5 | — |
| | 1450 | | 70 | 37~231 | 3.1 | 1.7 | Incomplete regeneration |
| Comparative Example 8 | 1300 | Spherical | — | — | — | 31.9 | — |
| | 1400 | | 83 | 41.5~302.5 | 2.7 | 7.3 | 12.1 |
| | 1500 | | 72 | 37~196 | 2.9 | 2.5 | Incomplete regeneration |
| Comparative Example 9 | 1300 | Spherical | — | — | — | 24.8 | — |
| | 1400 | | 91 | 41.5~302.5 | 2.4 | 18.8 | — |
| | 1500 | | 85 | 37~302.5 | 2.9 | 2.0 | Incomplete regeneration |
| Comparative Example 10 | 1400 | Spherical | — | — | — | 30.1 | — |
| | 1450 | | 106 | 49~302.5 | 2.9 | 1.4 | Incomplete regeneration |
| Comparative Example 11 | 1400 | Spherical | — | — | — | 23.5 | — |
| | 1450 | | 85 | 41.5~302.5 | 2.9 | 1.9 | Incomplete regeneration |
| Comparative Example 12 | 1400 | Spherical | — | — | — | 28.8 | — |
| | 1500 | | 85 | 37~302.5 | 2.8 | 2.0 | Incomplete regeneration |
| Comparative Example 13 | 1400 | Spherical | 78 | 37~231 | 2.3 | 20.9 | 12.8 |
| | 1500 | | 71 | 37~231 | 2.9 | 1.4 | Incomplete regeneration |

The raw material compositions for preparing oxygen carriers of Examples 1 to 8 include 55 weight % to 80 weight % nickel hydroxide, 15 weight % to 40 weight % boehmite, and 3 weight % to 15 weight % magnesium oxide or magnesium hydroxide.

As can be seen from Tables 7 and 8 above, the oxygen carriers prepared using the raw material compositions for preparing oxygen carriers of Examples 1 to 8 of the present invention exhibit a high strength characteristic of a attrition index of 10% or lower at a calcination temperature in the range of 1200° C. to 1300° C. and have physical properties suitable for an industrial fluidized bed process.

That is, the oxygen carriers of Examples 1 to 8 have an average particle size in the range of 65 to 81 μm, a particle size distribution in the range of 37 to 302.5 μm, a packing density in the range of 1.8 to 2.8 g/ml, and a attrition index of 10% or lower.

In addition, shapes of all of the oxygen carriers of Examples 1 to 8 are spherical. It can be seen that, for the oxygen carriers of Comparative Examples 1 to 13 prepared using NiO instead of Ni(OH)$_2$, which is an active raw material used in Examples of the present invention, the calcination temperature was elevated to 1400° C. or higher to exhibit a high strength characteristic of a attrition index of 10% or lower.

In addition, for the oxygen carriers of Comparative Examples 1 and 2 prepared using alpha alumina, the calcination temperature was elevated to 1500° C. or higher to exhibit a high strength characteristic of a attrition index of 10% or lower. Also, for the oxygen carriers of Comparative Examples 3 and 4 prepared using gamma alumina, the calcination temperature was elevated to 1400° C. or higher to exhibit a high strength characteristic of a attrition index of 10% or lower. The oxygen carriers of Comparative Example 5 prepared using MgAl$_2$O$_4$ as a support material had a attrition index of 20% or higher even at the calcination temperature of 1500° C., and thus there was difficulty in preparing particles with high mechanical strength.

In Comparative Examples 6 to 13, raw material compositions were designed and prepared to have the same composition as those in Examples based on a dried raw material sample after calcination using the same support raw materials as in Examples except that the active raw material was changed to NiO. However, it was confirmed that it is not possible to obtain a high strength characteristic of a attrition index of 10% or lower at the calcination temperature of 1200° C., and it was confirmed that calcination should be performed at the calcination temperature of 1400° C. or higher to obtain the high strength characteristic.

Particularly, the oxygen carriers of Comparative Examples 10 to 13 having high Mg content were unable to obtain the high strength characteristic even at the calcination temperature of 1400° C., unlike the oxygen carriers of Examples 5 to 8 which had the same Mg content but were able to obtain the high strength characteristic of a attrition index of 10% or lower at the calcination temperature in the range of 1200° C. to 1300° C.

The oxygen transfer capacity of the oxygen carriers of Examples which exhibited the high strength characteristic of the attrition index of 10% or lower was in the range of 12.6 weight % to 14.7 weight %, which is up to 20% higher than the range of 12.1 to 12.8 weight % of the oxygen transfer capacity of the oxygen carriers of Comparative Examples. Also, the oxygen transfer rate was higher in the oxygen carriers of Examples in both the oxidation reaction and the reduction reaction as compared with the oxygen carriers of Comparative Examples.

The oxygen carriers of Comparative Examples 2, 4, 10, 11, 12, and 13 prepared so that the Mg content was 5.1 parts by weight exhibited an incomplete regeneration characteristic in which, when calcination was performed at 1400° C. or higher to obtain the high strength characteristic of a attrition index of 10% or lower, the weight of the oxygen carriers was not restored to the weight thereof in a completely oxidized state before the cycle reaction in an oxidation reaction step after the reduction reaction. Accordingly, although the Ni content in the oxygen carriers was similar to that in the oxygen carriers of Examples, the oxygen transfer capacity was significantly decreased. This indicates that a utilization rate of active raw materials added in the oxygen carriers is low. In contrast, the oxygen carriers of Examples 5 to 8 having the same Mg content exhibited an excellent oxygen transfer characteristic, in which the oxygen carriers were restored to an initial oxidized state, while having the high strength characteristic of a attrition index of 10% or lower.

Among the oxygen carriers of Examples and Comparative Examples, all of the oxygen carriers having the high strength characteristic of a attrition index of 10% or lower while having the Mg content of 2.5 parts by weight exhibited a weak agglomeration phenomenon in which particles bound to each other after a reaction during the oxidation-reduction cycle. In contrast, the oxygen carriers of Examples 5 to 8 prepared by increasing the Mg content to 5.1 parts by weight did not exhibit the agglomeration phenomenon and were confirmed to be suitable for long-term use in the CLC process.

In this way, it can be seen that, using the compositions proposed by Comparative Examples, it is not possible to prepare oxygen carriers not exhibiting the agglomeration phenomenon by high Mg content and having excellent oxygen transfer capacity and oxygen transfer rate while having the high strength characteristic of a attrition index of 10% or lower even at the calcination temperature of 1300° C. or lower.

The above results confirm that it is possible to prepare oxygen carriers having a form suitable for a fluidized bed process that are capable of effectively combusting a fuel in the CLC technology even at the calcination temperature in the range of 1100° C. to 1300° C. by using the raw material compositions for preparing oxygen carriers of Examples 1 to 8 proposed in the present invention and the method of preparing oxygen carriers using the same. The oxygen carriers prepared using such raw material compositions and preparation methods may be easily mass-prepared and have improved particle performance, thereby making the CLC process more economical. Therefore, the oxygen carriers may become a competitive technology.

The oxygen carriers of Examples 1 to 8 according to the present invention have physical properties and reactivity suitable for the fluidized bed process of the CLC technology. As compared with oxygen carriers prepared using different raw support materials and NiO, the oxygen carriers of Examples 1 to 8 may obtain the high strength characteristic even at a lower calcination temperature such that preparation costs are lowered. Also, the oxygen carriers of Examples 1 to 8 have excellent attrition resistance and cause little particle loss due to attrition by rapid solid circulation in the fluidized bed process, thereby decreasing a particle makeup quantity. Also, the oxygen carriers of Examples 1 to 8 have excellent oxygen transfer performance and may use a relatively small amount of particles such that it is possible to make the process compact and more economical.

TABLE 9

|  | Calcination temperature (° C.) | Shape | Average particle size (μm) | Particle size distribution (μm) | Packing density (g/ml) | Attrition index AI (%) | Oxygen transfer capacity (parts by weight) |
|---|---|---|---|---|---|---|---|
| Example 9 | 1400 | Spherical | 83 | 37~231 | 3.7 | 3.8 | 15.9 |
| Comparative Example 14 | 1300 | Spherical | 75 | 37~302.5 | 2.4 | 18.2 | 11.9 |
|  | 1400 |  | 74 | 37~302.5 | 2.5 | 1.1 | 11.2 |
| Comparative Example 15 | 1300 | Spherical | — | — | — | 61.7 | — |
|  | 1400 |  | 114 | 37~302.5 | 2.6 | 9.0 | 10.8 |
| Comparative Example 16 | 1300 | Spherical | — | — | — | 50.7 | — |
|  | 1400 |  | 99 | 41.5~231 | 2.6 | 22.1 | — |
|  | 1500 |  | 98 | 41.5~231 | 2.6 | 22.0 | — |

TABLE 9-continued

| | Calcination temperature (° C.) | Shape | Average particle size (μm) | Particle size distribution (μm) | Packing density (g/ml) | Attrition index AI (%) | Oxygen transfer capacity (parts by weight) |
|---|---|---|---|---|---|---|---|
| Comparative Example 17 | 1200 | Dimple | — | — | — | 66.3 | — |
| | 1300 | | 87 | 49~302.5 | 3.1 | 17.9 | 14.7 |
| | 1400 | | 78 | 41.5~302.5 | 3.4 | 5.6 | 14.5 |

The raw material composition for preparing the oxygen carriers of Example 9 includes 55 weight % to 75 weight % nickel oxide, and 25 weight % to 45 weight % cerium hydroxide.

As can be seen in Table 9 above, the oxygen carriers prepared using the composition according to Example 9 of the present invention had an average particle size of 72 μm at the calcination temperature of 1400° C., a particle size distribution in the range of 37 to 231 μm, a packing density of 3.7 g/ml, a attrition index of 5% or lower, and an oxygen transfer capacity of 15.9 parts by weight, thereby having excellent performance. In this way, it was confirmed that the oxygen carriers of Example 9 exhibited a high strength characteristic and had physical properties suitable for an industrial fluidized bed process.

On the other hand, the oxygen carriers of Comparative Examples 14 and 15 prepared using gamma alumina or alpha alumina as raw support materials exhibited an oxygen transfer capacity of 11.2 parts by weight or less, which is significantly lower than the oxygen transfer capacity of the oxygen carriers of Example 9, at the calcination temperature of 1400° C.

Meanwhile, the oxygen carriers of Comparative Example 16 prepared using magnesium aluminate as a raw support material were unable to obtain a high strength characteristic at the calcination temperature of 1500° C.

In addition, the oxygen carriers of Comparative Example 17 prepared using $CeO_2$ instead of $Ce(OH)_4$, which is a raw support material of Examples, had a dimple shape and thus the oxygen transfer capacity, the attrition index, or the like thereof were not suitable for application to a fluidized bed process. When dimple-shaped particles are used in a fluidized bed process for a long period of time, as compared with spherical particles, attrition loss of the particles is higher, and thus there is a concern that a makeup quantity for the particle loss may be increased.

The NiO-based oxygen carriers prepared using cerium hydroxide ($Ce(OH)_4$) as the raw support material of Example 9 transferred the largest amount of oxygen in both the oxidation and reduction reactions in a reaction time of 1 minute.

On the other hand, it was confirmed that the oxygen carriers prepared using cerium oxide ($CeO_2$) as the raw support material of Comparative Example 14 also had excellent oxygen transfer performance, but since the shape thereof was not spherical, the oxygen carriers were not suitable for the fluidized bed process, and the total oxygen transfer capacity was also lower than that of the oxygen carriers of Example 9.

In this way, it can be seen that the compositions proposed as Comparative Examples 14 to 17 cannot prepare oxygen carriers which are spherical and have a high strength characteristic of a attrition index of 10% or lower and a high oxygen transfer capacity of 15 wt % or higher as the oxygen carriers of Example 9.

TABLE 10

| | Calcination temperature (° C.) | Shape | Average particle size (μm) | Particle size distribution (μm) | Packing density (g/ml) | Attrition index AI (%) | Oxygen transfer capacity (parts by weight) |
|---|---|---|---|---|---|---|---|
| Example 10 | 1100 | Spherical | 77 | 37~302.5 | 1.8 | 13.1 | — |
| | 1200 | | 71 | 37~231.0 | 2.8 | 3.7 | 13.4 |
| Example 11 | 1100 | Spherical | 101 | 37~302.5 | 1.5 | 25.5 | — |
| | 1200 | | 86 | 37~302.5 | 2.2 | 4.9 | 13.2 |
| Example 12 | 1100 | Spherical | 78 | 37~231.0 | 1.7 | 36.1 | — |
| | 1200 | | 68 | 37~231.0 | 2.5 | 6.1 | 14.2 |
| Example 13 | 1000 | Spherical | 76 | 37~302.5 | 2.3 | 27.8 | — |
| | 1100 | | 72 | 37~302.5 | 2.6 | 7.9 | 13.5 |
| Example 14 | 1000 | Spherical | 85 | 37~302.5 | 2.2 | 9.4 | — |
| | 1100 | | 78 | 37~302.5 | 2.9 | 2.1 | 14.1 |
| Example 15 | 1000 | Spherical | 82 | 37~302.5 | 2.6 | 16.2 | — |
| | 1100 | | 73 | 37~302.5 | 2.9 | 3.1 | 14.7 |

TABLE 11

|  | Calcination Temperature (° C.) | Shape | Average particle size (μm) | Particle size distribution (μm) | Packing density (g/ml) | Attrition index AI (%) | Oxygen transfer capacity (parts by weight) |
|---|---|---|---|---|---|---|---|
| Comparative Example 18 | 1200 | Spherical | 75 | 37~302.5 | 2.5 | 32.2 | — |
| Comparative Example 19 | 1200 | Spherical | 82 | 37~302.5 | 2.7 | 36.9 | — |

The raw material compositions for preparing the oxygen carriers of Examples 10 to 15 include 55 weight % to 80 weight % nickel hydroxide, 5 weight % to 35 weight % boehmite, 3 weight % to 20 weight % cerium oxide or cerium hydroxide, 3 weight % to 15 weight % magnesium oxide or magnesium hydroxide, and 0 weight % to 15 weight % titanium oxide.

As can be seen from Tables 10 and 11, the oxygen carriers prepared in Examples 10 to 15 of the present invention exhibited a high strength characteristic of a attrition index of 10% or lower at a calcination temperature in the range of 1000° C. to 1250° C. and had physical properties suitable for an industrial fluidized bed process. Also, it was confirmed that the oxygen carriers prepared in Examples 11 to 15 had a spherical shape, an average particle size in the range of 68 to 86 μm, and a particle size distribution in the range of 37 to 302.5 μm. In this way, it was confirmed that the oxygen carriers of the present invention exhibited a high strength characteristic and had physical properties suitable for the industrial fluidized bed process.

All of the oxygen carriers prepared in Examples 10 to 15 had a spherical shape.

Particularly, the oxygen carriers of Examples 13 to 15 to which $TiO_2$ was added exhibited a high strength characteristic at a lower calcination temperature than the oxygen carriers of Examples 10 to 12 to which $TiO_2$ was not added. This shows that $TiO_2$ has an effect of lowering the calcination temperature.

In contrast, the oxygen carriers of Comparative Examples 18 to 24 prepared using NiO instead of $Ni(OH)_2$, which is an active raw material used in Examples of the present invention, required a calcination temperature of 1400° C. or higher to obtain a high strength characteristic of a attrition index of 10% or lower. The oxygen carriers of Comparative Example 18 prepared using gamma alumina exhibited the high strength characteristic of a attrition index of 10% or lower at a calcination temperature of 1500° C., and the oxygen carriers of Comparative Example 19 prepared using alpha alumina exhibited the high strength characteristic of a attrition index of 10% or lower at a calcination temperature of 1400° C.

In addition, the oxygen carriers of Comparative Example 20 prepared using $MgAl_2O_4$ as a support material had a attrition index of 20% or higher even at the calcination temperature of 1500° C., and thus there was difficulty in preparing particles with high mechanical strength.

In Comparative Examples 21 to 24, raw material compositions were designed and prepared to have the same composition as those in Examples based on a dried raw material sample after calcination using the same support raw materials as in Examples except that the active raw material was changed to NiO. However, it was confirmed that it is not possible to obtain a high strength characteristic of a attrition index of 10% or lower at the calcination temperature of 1200° C., and it was confirmed that calcination should be performed at the calcination temperature of 1400° C. or higher to obtain the high strength characteristic.

Meanwhile, the oxygen carriers of Comparative Examples 25 and 26 prepared using nickel hydroxide (Ni$(OH)_2$) as the active material like Examples of the present invention and using a mixture of magnesium hydroxide (Mg$(OH)_2$) and alpha alumina or gamma alumina were not able to obtain a high mechanical strength of a attrition index of 10% or lower like Examples of the present invention by calcination at 1200° C.

In addition, it can be seen from Examples 10 to 14 that the oxygen transfer capacity is improved when the $CeO_2$ content increases. Also, it can be seen from Examples 10 and 14 and 11 and 15 that adding $TiO_2$ is also effective in improving oxygen transfer performance. On the other hand, the oxygen carriers of Comparative Examples exhibited an incomplete regeneration characteristic in which, when calcination was performed at 1400° C. or higher to obtain the high strength characteristic of a attrition index of 10% or lower, the weight of the oxygen carriers was not restored to the weight thereof in an initial completely oxidized state when the oxidation reaction step was re-performed after the reduction reaction. Accordingly, although the Ni content in the oxygen carriers was similar to that in the oxygen carriers of Examples, the oxygen transfer capacity was significantly decreased. This indicates that a utilization rate of active raw materials added in the oxygen carriers is low. In contrast, the oxygen carriers of Examples exhibited an excellent oxygen transfer characteristic, in which the oxygen carriers were restored to the initial oxidized state, while having the high strength characteristic of a attrition index of 10% or lower.

In this way, it can be seen that, using the compositions proposed as Comparative Examples, it is not possible to prepare oxygen carriers having excellent oxygen transfer capacity and oxygen transfer rate while having the high strength characteristic of a attrition index of 10% or lower at the calcination temperature of 1200° C. or lower like the oxygen carriers of Examples.

The above results confirm that it is possible to prepare high-strength Ni-based oxygen carriers having a form suitable for a fluidized bed process that are capable of effectively combusting a fuel in the CLC technology even at the calcination temperature in the range of 1000° C. to 1250° C. by using the raw material compositions for preparing oxygen carriers of Examples 10 to 15 of the present invention and the method of preparing oxygen carriers using the same. The oxygen carriers prepared using such raw material compositions and preparation methods may be easily mass-prepared and have improved particle performance, thereby making the CLC process more economical and may become a competitive technology.

The oxygen carriers of Examples 10 to 15 according to the present invention have physical properties and reactivity suitable for the fluidized bed process of the CLC technology. As compared with Ni-based oxygen carriers prepared using different raw support materials and NiO, the oxygen carriers of Examples 10 to 15 may obtain the high strength characteristic even at a lower calcination temperature such that preparation costs are lowered. Also, the oxygen carriers of Examples 10 to 15 have excellent attrition resistance and cause little particle loss due to attrition by rapid solid circulation in the fluidized bed process, thereby decreasing a particle makeup quantity. Also, the oxygen carriers of Examples 10 to 15 have excellent oxygen transfer performance and may use a relatively small amount of particles such that it is possible to make the process compact and more economical.

As an example, the result of evaluation for oxygen carriers prepared using NiO and gamma alumina by laboratory preparation methods such as a conventional impregnation method, a coprecipitation method, and a physical mixing method showed that nickel aluminate ($NiAl_2O_4$), which is a stable compound, was easily formed due to an interaction with NiO during calcination process, and thus oxygen transfer performance of finally obtained oxygen carriers was not good. Therefore, alpha alumina is considered to be more suitable as a support material of NiO-based oxygen carriers. Accordingly, conventionally, even when oxygen carriers having high NiO content are mass-prepared using a spray-drying method following a result of research using a laboratory method, alpha alumina has been commonly used as a raw support material. However, since alpha alumina has a very stable structure, in order to give strength (attrition resistance) sufficient for application to a fluidized bed process to the oxygen carriers prepared by the spray-drying method using alpha alumina as a support material of NiO, calcination should be performed at a temperature of 1400° C. or higher which is significantly higher than the calcination temperature proposed in the laboratory method. When the particles are calcined at a high temperature, unlike when the evaluation is performed at a lower calcination temperature, an intensity of an interaction between NiO and alpha alumina increases, and thus a greater amount of nickel aluminate ($NiAl_2O_4$), which is a stable compound, is formed as compared with the low-temperature calcination. Also, as the sintering phenomenon of the active material becomes more pronounced, the oxygen transfer performance is degraded. That is, a utilization rate of NiO, which is an active material, is decreased.

However, as can be seen from the above-described Examples and Comparative Examples, the oxygen carriers prepared using the raw material composition for preparing oxygen carriers of the present invention may have excellent long-term durability and oxygen transfer performance while having a shape, a particle size, a particle size distribution, and a mechanical strength or attrition resistance suitable for a CLC circulating fluidized bed process. In this way, oxygen carrier inventory in a CLC process and a makeup quantity to compensate for attrition loss which occurs during a long-term operation may be reduced.

The configurations and actions of the present invention have been described above on the basis of preferred embodiments according to the present invention, but the present invention is not limited to specific embodiments, and those of ordinary skill in the art may modify and change the present invention in various ways within the scope not departing from the idea and technical scope of the present invention defined in the claims below.

The invention claimed is:

1. A raw material composition for producing oxygen carriers by spray-drying method, the raw material composition to be calcinated comprises 55 parts by weight to 80 parts by weight of nickel hydroxide, 15 parts by weight to 40 parts by weight of boehmite, and 3 parts by weight to 15 parts by weight of magnesium oxide or magnesium hydroxide, thereby lowering the calcination temperature for improving oxygen transfer performance,
wherein the oxygen carriers are formed by calcination after the spray-drying, and
wherein when the calcination temperature is 1200° C., the oxygen carriers have an oxygen transfer capacity of 12.5 parts by weight to 25 parts by weight based on the total weight of the oxygen carriers and have a wear index obtained by Equation 1 below of 20% or lower:

$$AI\ (\%) = [(W2)/(W1)] \qquad \text{[Equation 1]}$$

In Equation 1, W1 represents a weight in g of a sample before the wear test, and W2 represents a weight in g of fine particles captured during the 5 hours of the wear test,
the wear test is conducted for 5 hours at a flow rate of 10.00 l/min (273.15 K, 1 bar) according to ASTM D5757-95 from the American Society for Testing Materials (ASTM) using a wear tester.

2. The raw material composition of claim 1, further comprising: cerium oxide or cerium hydroxide.

3. The raw material composition of claim 1, wherein the nickel hydroxide has an average particle size in the range of 0 to 5 μm and a purity of 98% or higher.

4. The raw material composition of claim 1, wherein the boehmite is in the form of a powder or sol and has an average particle size in the range of 0 to 5 μm and a purity of 98% or higher in a state in which the boehmite is dispersed in a solvent.

5. The raw material composition of claim 2, wherein the cerium oxide or cerium hydroxide has an average particle size in the range of 0 to 5 μm and a purity of 98% or higher.

6. The raw material composition of claim 1, wherein the magnesium oxide or magnesium hydroxide has an average particle size in the range of 0 to 5 μm and a purity of 97% or higher.

7. The raw material composition of claim 2, further comprising:
titanium oxide having an average particle size in the range of 0 to 5 μm and a purity of 95% or higher.

8. Oxygen carriers formed from the raw material composition of claim 1 and comprising nickel oxide.

9. The oxygen carriers of claim 8, wherein the oxygen carriers have a wear index of 10% or lower.

10. The oxygen carriers of claim 8, wherein the oxygen carriers have a shape of spherical non-blowholes, an average particle size in the range of 60 μm to 150 μm, a particle size distribution in the range of 30 μm to 400 μm, and a packing density in the range of 1.0 g/ml to 4.0 g/ml.

11. The oxygen carriers of claim 8, wherein an oxygen transfer capacity of the oxygen carriers is in the range of 8 parts by weight to 25 parts by weight based on the total weight of the oxygen carriers.

12. A method of producing oxygen carriers by spray-drying, the method comprising:
producing a slurry for producing oxygen carriers by mixing a solvent with a raw material composition;
stirring the slurry to produce a homogenized slurry;
spray-drying the homogenized slurry to form solid particles; and drying and baking the formed solid particles to produce oxygen carriers, wherein the raw material composition for producing oxygen carriers, the raw material composition to be calcinated comprises 55 parts by weight to 80 parts by weight of nickel hydroxide, 15 parts by weight to 40 parts by weight of boehmite, and 3 parts by weight to 15 parts by weight of magnesium oxide or magnesium hydroxide, thereby lowering the calcination temperature for improving oxygen transfer performance, wherein when the calcination temperature is 1200° C., the oxygen carriers have an oxygen transfer capacity of 12.5 parts by weight to 25 parts by weight based on the total weight of the oxygen carriers and have a wear index obtained by Equation 1 below of 20% or lower:

$$AI\ (\%)=[(W2)/(W1)]\qquad\qquad\text{[Equation 1]}$$

In Equation 1, W1 represents a weight in g of a sample before the wear test, and W2 represents a weight in g of fine particles captured during the 5 hours of the wear test, the wear test is conducted for 5 hours at a flow rate of 10.00 l/min (273.15 K, 1 bar) according to ASTM D5757-95 from the American Society for Testing Materials (ASTM) using a wear tester.

13. The method of claim 12, wherein, in the producing of the slurry for producing oxygen carriers, the solvent and the raw material composition for producing oxygen carriers are mixed at a weight ratio of 15 to 60:40 to 85, and the solvent is water.

14. The method of claim 12, wherein, in the producing of the slurry for producing oxygen carriers, the slurry further comprises one or more additives, wherein the additive(s) are selected from a group consisting of a dispersant, a defoamer, and an organic binder.

15. The method of claim 14, wherein the dispersant includes one or more of an anionic surfactant, a cationic surfactant, an amphoteric surfactant, and a nonionic surfactant.

16. The method of claim 15, wherein the anionic surfactant includes one or more of a poly-carboxylate salt and a poly-carboxylate amine salt.

17. The method of claim 14, wherein the defoamer includes one or more of a silicone-based defoamer, a metal soap-based defoamer, an amide-based defoamer, a polyether-based defoamer, a polyester-based defoamer, a polyglycol-based defoamer, and an alcohol-based defoamer.

18. The method of claim 14, wherein the organic binder includes one or more of a polyvinyl alcohol, polyethylene glycol, and methylcellulose.

19. The method of claim 14, wherein:
the additives include all of the dispersant, the defoamer, and the organic binder; and
as the additives, 0.01 to 5.0 parts by weight of the dispersant, 0.01 to 1.0 parts by weight of the defoamer, and 1.0 to 5.0 parts by weight of the organic binder are included based on 100 parts by weight of the raw material composition for producing oxygen carriers.

20. The method of claim 12, wherein the stirring of the slurry to produce the homogenized slurry further comprises removing foreign substances from a stirred and milled slurry.

21. The method of claim 12, wherein the (spray-drying of the homogenized slurry to form the solid particles comprises injecting the homogenized slurry into a spray-dryer and then spraying the homogenized slurry while maintaining an inlet temperature in the range of 260° C. to 300° C. and an outlet temperature in the range of 90° C. to 150° C. to form the solid particles.

22. The method of claim 12, wherein the drying and baking of the formed solid particles to produce oxygen carriers comprises drying the formed solid particles at 110° C. to 150° C. for 2 to 24 hours, injecting the dried solid particles into a high-temperature baking furnace, and elevating a temperature therein to a temperature in the range of 1000° C. to 1450° C. at a speed in the range of 1° C./min to 5° C./min to bake the dried solid particles for 2 to 10 hours.

23. A chemical looping combustion (CLC) method including causing the oxygen carriers of claim 8 to react with a fuel so that the oxygen carriers are reduced and the fuel is combusted, and causing the reduced oxygen carriers to react with oxygen so that the oxygen carriers are regenerated.

* * * * *